United States Patent
Yafin et al.

(10) Patent No.: US 12,523,579 B2
(45) Date of Patent: Jan. 13, 2026

(54) DETECTING PLATELETS IN A BLOOD SAMPLE

(71) Applicant: S.D. SIGHT DIAGNOSTICS LTD, Tel Aviv (IL)

(72) Inventors: Peretz Yafin, Kdumim (IL); Dan Gluck, Kadima (IL); Amir Zait, Binyamina (IL); Yochay Shlomo Eshel, Sde Warburg (IL); Sarah Levy, Jaffa (IL); Joseph Joel Pollak, Neve Daniel (IL)

(73) Assignee: S.D. Sight Diagnostics Ltd., Tel Aviv (IL)

( * ) Notice: Subject to any disclaimer, the term of this patent is extended or adjusted under 35 U.S.C. 154(b) by 809 days.

(21) Appl. No.: 17/783,930

(22) PCT Filed: Dec. 10, 2020

(86) PCT No.: PCT/IB2020/061724
§ 371 (c)(1),
(2) Date: Jun. 9, 2022

(87) PCT Pub. No.: WO2021/116955
PCT Pub. Date: Jun. 17, 2021

(65) Prior Publication Data
US 2023/0003622 A1 Jan. 5, 2023

Related U.S. Application Data

(60) Provisional application No. 62/946,998, filed on Dec. 12, 2019.

(51) Int. Cl.
*G01N 1/00* (2006.01)
*G01N 1/28* (2006.01)
(Continued)

(52) U.S. Cl.
CPC ....... *G01N 1/2813* (2013.01); *G01N 15/1468* (2013.01); *G01N 2015/018* (2024.01); *G01N 2015/1486* (2013.01)

(58) Field of Classification Search
None
See application file for complete search history.

(56) References Cited

U.S. PATENT DOCUMENTS

| | | |
|---|---|---|
| 3,203,768 A | 8/1965 | Tiller et al. |
| 3,603,156 A | 9/1971 | Konkol |

(Continued)

FOREIGN PATENT DOCUMENTS

| | | |
|---|---|---|
| CA | 2655024 C | 11/2014 |
| CN | 1918501 A | 2/2007 |

(Continued)

OTHER PUBLICATIONS

An Office Action dated Jul. 12, 2022, which issued during the prosecution of U.S. Appl. No. 16/088,321.

(Continued)

*Primary Examiner* — Jyoti Nagpaul
(74) *Attorney, Agent, or Firm* — Sughrue Mion, PLLC

(57) ABSTRACT

Apparatus and methods are provided including imaging a blood sample that is a cell suspension deposited in a sample chamber. The cells are allowed to settle in the sample chamber to form a monolayer of cells. At least one microscopic image is acquired of the monolayer of cells using a microscope (24) while the microscope is focused at a monolayer-depth-level, and a first platelet count of platelets that have settled within the monolayer, is determined. An additional microscopic image of the simple is acquired, while the microscope is focused at a different depth level from the monolayer-depth-level, and a second platelet count of platelets that have not settled within the monolayer is (Continued)

determined. An output is generated based upon the first and second platelet counts. Other applications are also described.

15 Claims, 13 Drawing Sheets

(51) Int. Cl.
*G01N 15/14* (2006.01)
*G01N 15/01* (2024.01)

(56) References Cited

U.S. PATENT DOCUMENTS

| | | | |
|---|---|---|---|
| 3,676,076 A | 7/1972 | Grady |
| 3,786,184 A | 1/1974 | Pieters |
| 3,916,205 A | 10/1975 | Kleinerman |
| 3,967,056 A | 6/1976 | Yata et al. |
| 4,030,888 A | 6/1977 | Yamamoto |
| 4,076,419 A | 2/1978 | Kleker |
| 4,097,845 A | 6/1978 | Bacus |
| 4,199,748 A | 4/1980 | Bacus |
| 4,209,548 A | 6/1980 | Bacus |
| 4,350,884 A | 9/1982 | Vollath |
| 4,453,266 A | 6/1984 | Bacus |
| 4,454,235 A | 6/1984 | Johnson |
| 4,494,479 A | 1/1985 | Drury et al. |
| 4,580,895 A | 4/1986 | Patel |
| 4,700,298 A | 10/1987 | Palcic et al. |
| 4,761,381 A | 8/1988 | Blatt et al. |
| 4,774,192 A | 9/1988 | Terminiello et al. |
| 4,803,352 A | 2/1989 | Bierleutgeb |
| 4,849,430 A | 7/1989 | Fleet |
| 4,851,330 A | 7/1989 | Kohne |
| 4,902,101 A | 2/1990 | Fujihara et al. |
| 5,001,067 A | 3/1991 | Coleman et al. |
| 5,064,282 A | 11/1991 | Curtis |
| 5,229,265 A | 7/1993 | Tometsko |
| 5,281,517 A | 1/1994 | Bacus et al. |
| 5,300,779 A | 4/1994 | Hillman et al. |
| 5,331,958 A | 7/1994 | Oppenheimer |
| 5,376,790 A | 12/1994 | Linker et al. |
| 5,430,542 A | 7/1995 | Shepherd et al. |
| 5,470,751 A | 11/1995 | Sakata et al. |
| 5,499,097 A | 3/1996 | Ortyn et al. |
| 5,566,249 A | 10/1996 | Rosenlof et al. |
| 5,625,706 A | 4/1997 | Lee et al. |
| 5,663,057 A | 9/1997 | Drocourt et al. |
| 5,671,288 A | 9/1997 | Wilhelm et al. |
| 5,672,861 A | 9/1997 | Fairley et al. |
| 5,674,457 A | 10/1997 | Williamsson et al. |
| 5,745,804 A | 4/1998 | Iwane |
| 5,782,770 A | 7/1998 | Mooradian et al. |
| 5,784,162 A | 7/1998 | Cabib et al. |
| 5,827,190 A | 10/1998 | Palcic et al. |
| 5,834,217 A | 11/1998 | Levine et al. |
| 5,932,872 A | 8/1999 | Price |
| 5,939,709 A | 8/1999 | Ghislain et al. |
| 5,948,686 A | 9/1999 | Wardlaw et al. |
| 5,978,497 A | 11/1999 | Lee et al. |
| 5,985,595 A | 11/1999 | Krider et al. |
| 5,993,702 A | 11/1999 | Davis |
| 6,005,964 A | 12/1999 | Reid et al. |
| 6,027,695 A | 2/2000 | Oldenburg et al. |
| 6,064,474 A | 5/2000 | Lee |
| 6,074,879 A | 6/2000 | Zelmanovic |
| 6,101,404 A | 8/2000 | Yoon |
| 6,235,536 B1 | 5/2001 | Wardlaw |
| 6,262,423 B1 | 7/2001 | Hell et al. |
| 6,262,798 B1 | 7/2001 | Shepherd et al. |
| 6,320,979 B1 | 11/2001 | Melen |
| 6,330,348 B1 | 12/2001 | Kerschmann et al. |
| 6,339,472 B1 | 1/2002 | Hafeman |
| 6,350,613 B1 | 2/2002 | Wardlaw et al. |
| 6,448,024 B1 | 9/2002 | Bruegger |
| 6,519,355 B2 | 2/2003 | Nelson |
| 6,554,788 B1 | 4/2003 | Hunley et al. |
| 6,582,964 B1 | 6/2003 | Samsoondar et al. |
| 6,611,777 B2 | 8/2003 | Samsoondar |
| 6,632,681 B1 | 10/2003 | Chu |
| 6,658,143 B2 | 12/2003 | Hansen |
| 6,664,528 B1 | 12/2003 | Cartlidge et al. |
| 6,711,516 B2 | 3/2004 | Samsoondar |
| 6,799,119 B1 | 9/2004 | Voorhees et al. |
| 6,819,408 B1 | 11/2004 | Scrivens et al. |
| 6,831,733 B2 | 12/2004 | Pettersson |
| 6,834,237 B2 | 12/2004 | Noergaard et al. |
| 6,836,559 B2 | 12/2004 | Abdel-fattah |
| 6,842,233 B2 | 1/2005 | Narisada |
| 6,866,823 B2 | 3/2005 | Wardlaw |
| 6,872,930 B2 | 3/2005 | Cartlidge et al. |
| 6,898,451 B2 | 5/2005 | Wuori |
| 6,903,323 B2 | 6/2005 | Cartlidge et al. |
| 6,929,953 B1 | 8/2005 | Wardlaw et al. |
| 6,949,384 B2 | 9/2005 | Samsoondar |
| 6,955,872 B2 | 10/2005 | Maples et al. |
| 6,956,650 B2 | 10/2005 | Boas |
| 6,989,891 B2 | 1/2006 | Braig et al. |
| 7,027,628 B1 | 4/2006 | Gagnon |
| 7,030,351 B2 | 4/2006 | Wasserman |
| 7,034,883 B1 | 4/2006 | Rosenqvist |
| 7,105,795 B2 | 9/2006 | Cartlidge et al. |
| 7,132,636 B1 | 11/2006 | Cartlidge |
| 7,133,547 B2 | 11/2006 | Marcelpoil |
| 7,151,246 B2 | 12/2006 | Fein et al. |
| 7,155,049 B2 | 12/2006 | Wetzel |
| 7,248,716 B2 | 7/2007 | Fein et al. |
| 7,274,810 B2 | 9/2007 | Reeves et al. |
| 7,283,217 B2 | 10/2007 | Ikeuchi |
| 7,288,751 B2 | 10/2007 | Cartlidge et al. |
| 7,305,109 B1 | 12/2007 | Gagnon |
| 7,324,694 B2 | 1/2008 | Chapoulaud |
| 7,329,537 B2 | 2/2008 | Qiu |
| 7,338,168 B2 | 3/2008 | Cartlidge et al. |
| 7,344,890 B2 | 3/2008 | Perez et al. |
| 7,346,205 B2 | 3/2008 | Walker, Jr. |
| 7,369,696 B2 | 5/2008 | Arini et al. |
| 7,385,168 B2 | 6/2008 | Cartlidge et al. |
| 7,387,898 B1 | 6/2008 | Gordon |
| 7,411,680 B2 | 8/2008 | Chang |
| 7,417,213 B2 | 8/2008 | Krief et al. |
| 7,425,421 B2 | 9/2008 | Dertinger |
| 7,439,478 B2 | 10/2008 | Cartlidge et al. |
| 7,450,223 B2 | 11/2008 | Ikeuchi |
| 7,450,762 B2 | 11/2008 | Morell |
| 7,460,222 B2 | 12/2008 | Kalveram |
| 7,490,085 B2 | 2/2009 | Walker et al. |
| 7,493,219 B1 | 2/2009 | Qi |
| 7,580,120 B2 | 8/2009 | Hamada |
| 7,599,893 B2 | 10/2009 | Sapir |
| 7,601,938 B2 | 10/2009 | Cartlidge et al. |
| 7,602,954 B2 | 10/2009 | Marcelpoil |
| 7,605,356 B2 | 10/2009 | Krief |
| 7,609,369 B2 | 10/2009 | Simon-Lopez |
| 7,630,063 B2 | 12/2009 | Padmanabhan |
| 7,633,604 B2 | 12/2009 | Ikeuchi |
| 7,638,748 B2 | 12/2009 | Krief et al. |
| 7,663,738 B2 | 2/2010 | Johansson |
| 7,668,362 B2 | 2/2010 | Olson |
| 7,692,131 B2 | 4/2010 | Fein et al. |
| 7,697,764 B2 | 4/2010 | Kataoka |
| 7,702,181 B2 | 4/2010 | Gouch |
| 7,706,862 B2 | 4/2010 | Alfano et al. |
| 7,713,474 B2 | 5/2010 | Schulman et al. |
| 7,747,153 B2 | 6/2010 | Ibaraki |
| 7,765,069 B2 | 7/2010 | Ostoich |
| 7,777,869 B2 | 8/2010 | Nerin |
| 7,787,109 B2 | 8/2010 | Dosmann et al. |
| 7,796,797 B2 | 9/2010 | Nakaya et al. |
| 7,863,552 B2 | 1/2011 | Cartlidge et al. |
| 7,869,009 B2 | 1/2011 | Dosmann et al. |
| 7,894,047 B2 | 2/2011 | Hamada |
| 7,911,617 B2 | 3/2011 | Padmanabhan |
| 7,925,070 B2 | 4/2011 | Sumida |
| 7,929,121 B2 | 4/2011 | Wardlaw |

(56) References Cited

U.S. PATENT DOCUMENTS

| | | |
|---|---|---|
| 7,933,435 B2 | 4/2011 | Hunter |
| 7,936,913 B2 | 5/2011 | Nordell |
| 7,951,599 B2 | 5/2011 | Levine |
| 7,995,200 B2 | 8/2011 | Matsumoto |
| 7,998,435 B2 | 8/2011 | Reed |
| 8,000,511 B2 | 8/2011 | Perz |
| 8,044,974 B2 | 10/2011 | Sumida |
| 8,045,782 B2 | 10/2011 | Li |
| 8,055,471 B2 | 11/2011 | Qi |
| 8,064,680 B2 | 11/2011 | Ramoser |
| 8,077,296 B2 | 12/2011 | Wardlaw |
| 8,081,303 B2 | 12/2011 | Levine |
| 8,105,554 B2 | 1/2012 | Kanigan et al. |
| 8,125,643 B2 | 2/2012 | Hansen |
| D655,421 S | 3/2012 | Lee et al. |
| 8,131,035 B2 | 3/2012 | Grady |
| 8,131,052 B2 | 3/2012 | Alexandrov |
| 8,150,114 B2 | 4/2012 | Svanberg |
| 8,154,713 B2 | 4/2012 | Simon-Lopez |
| 8,165,385 B2 | 4/2012 | Reeves |
| 8,175,353 B2 | 5/2012 | Westphal |
| 8,179,597 B2 | 5/2012 | Namba |
| 8,184,273 B2 | 5/2012 | Dosmann |
| 8,192,995 B2 | 6/2012 | Zhang et al. |
| 8,216,832 B2 | 7/2012 | Battrell et al. |
| 8,224,058 B2 | 7/2012 | Lindberg |
| 8,269,954 B2 | 9/2012 | Levine |
| 8,280,134 B2 | 10/2012 | Hoyt |
| 8,310,659 B2 | 11/2012 | Wardlaw |
| 8,320,655 B2 | 11/2012 | Sarachan |
| 8,327,724 B2 | 12/2012 | Fairs |
| 8,331,642 B2 | 12/2012 | Zerfass |
| 8,339,586 B2 | 12/2012 | Zahniser |
| 8,345,227 B2 | 1/2013 | Zahniser |
| 8,351,676 B2 | 1/2013 | Dai |
| 8,363,221 B2 | 1/2013 | Hansen |
| 8,379,944 B2 | 2/2013 | Grady |
| 8,406,498 B2 | 3/2013 | Ortyn |
| 8,428,331 B2 | 4/2013 | Dimarzio |
| 8,432,392 B2 | 4/2013 | Kim |
| 8,477,294 B2 | 7/2013 | Zahniser |
| 8,481,303 B2 | 7/2013 | Faris et al. |
| 8,488,111 B2 | 7/2013 | Zahniser |
| 8,491,499 B2 | 7/2013 | Choi et al. |
| 8,526,704 B2 | 9/2013 | Dobbe |
| 8,570,496 B2 | 10/2013 | Chen |
| 8,582,924 B2 | 11/2013 | De La Torre-bueno |
| 8,638,427 B2 | 1/2014 | Wardlaw |
| 8,712,142 B2 | 4/2014 | Rajpoot |
| 8,736,824 B2 | 5/2014 | Matsui |
| 8,744,165 B2 | 6/2014 | Liu |
| 8,778,687 B2 | 7/2014 | Levine |
| 8,787,650 B2 | 7/2014 | Marugame |
| 8,792,693 B2 | 7/2014 | Satish |
| 8,837,803 B2 | 9/2014 | Wang et al. |
| 8,849,024 B2 | 9/2014 | Shinoda |
| 8,873,827 B2 | 10/2014 | Mcculloch |
| 8,877,458 B2 | 11/2014 | Maurer |
| 8,878,923 B2 | 11/2014 | Henderson |
| 8,885,154 B2 | 11/2014 | Wardlaw |
| 8,885,912 B2 | 11/2014 | Sui |
| 8,891,851 B2 | 11/2014 | Spaulding |
| 8,922,761 B2 | 12/2014 | Zahniser |
| 8,942,458 B2 | 1/2015 | Takahashi |
| 8,964,171 B2 | 2/2015 | Zahniser |
| 8,992,750 B1 | 3/2015 | Beaty |
| 8,994,930 B2 | 3/2015 | Levine |
| 9,012,868 B2 | 4/2015 | Courtney et al. |
| 9,041,792 B2 | 5/2015 | Van Leeuwen |
| 9,046,473 B2 | 6/2015 | Levine et al. |
| 9,050,595 B2 | 6/2015 | Miller et al. |
| 9,064,301 B2 | 6/2015 | Zie et al. |
| 9,176,121 B2 | 11/2015 | Winkelman et al. |
| 9,186,843 B2 | 11/2015 | Chan et al. |
| 9,240,043 B2 | 1/2016 | Christiansen |
| 9,322,767 B2 | 4/2016 | Ehrenkranz |
| 9,329,129 B2 | 5/2016 | Pollak et al. |
| 9,342,734 B2 | 5/2016 | Lin et al. |
| 9,404,852 B2 | 8/2016 | Braig et al. |
| 9,470,609 B2 | 10/2016 | Wimberger-friedl |
| 9,477,875 B2 | 10/2016 | Ohya |
| 9,522,396 B2 | 12/2016 | Bachelet |
| 9,528,978 B2 | 12/2016 | Yamada |
| 9,588,033 B2 | 3/2017 | Zahniser et al. |
| 9,767,343 B1 | 9/2017 | Jones et al. |
| 9,820,990 B2 | 11/2017 | Pak et al. |
| 9,933,363 B2 | 4/2018 | Danuser et al. |
| 9,934,571 B2 | 4/2018 | Ozaki |
| 9,976,945 B2 | 5/2018 | Kendall et al. |
| 10,024,858 B2 | 7/2018 | Smith et al. |
| 10,061,972 B2 | 8/2018 | Champlin |
| 10,093,957 B2 | 10/2018 | Pollak et al. |
| 10,169,861 B2 | 1/2019 | Ozaki et al. |
| 10,176,565 B2 | 1/2019 | Greenfield |
| 10,217,219 B2 | 2/2019 | Rimm et al. |
| 10,281,386 B2 | 5/2019 | Hsu et al. |
| 10,395,368 B2 | 8/2019 | Berezhna et al. |
| 10,482,595 B2 | 11/2019 | Yorav-Raphael et al. |
| 10,488,644 B2 | 11/2019 | Eshel |
| 10,508,983 B2 | 12/2019 | Kendall et al. |
| 10,527,635 B1 | 1/2020 | Bhatia et al. |
| 10,640,807 B2 | 5/2020 | Pollak |
| 10,663,712 B2 | 5/2020 | Eshel |
| 10,843,190 B2 | 11/2020 | Bachelet |
| 11,099,175 B2 | 8/2021 | Zait et al. |
| 11,199,690 B2 | 12/2021 | Eshel |
| 11,609,413 B2 | 3/2023 | Yorav-Raphael et al. |
| 2002/0009711 A1 | 1/2002 | Wada et al. |
| 2002/0028158 A1 | 3/2002 | Wardlaw et al. |
| 2002/0028471 A1 | 3/2002 | Oberhardt |
| 2003/0017085 A1 | 1/2003 | Kercso et al. |
| 2003/0161514 A1 | 8/2003 | Curry |
| 2003/0170613 A1 | 9/2003 | Straus |
| 2003/0197925 A1 | 10/2003 | Hamborg |
| 2003/0208140 A1 | 11/2003 | Pugh |
| 2003/0224522 A1 | 12/2003 | de Jong |
| 2003/0227612 A1 | 12/2003 | Fein et al. |
| 2003/0227673 A1 | 12/2003 | Nakagawa |
| 2003/0231791 A1 | 12/2003 | Torre-Bueno et al. |
| 2004/0054283 A1 | 3/2004 | Corey et al. |
| 2004/0122216 A1 | 6/2004 | Nielsen |
| 2004/0132171 A1 | 7/2004 | Rule et al. |
| 2004/0170312 A1 | 9/2004 | Soenksen |
| 2004/0185447 A1 | 9/2004 | Maples et al. |
| 2004/0218804 A1 | 11/2004 | Affleck et al. |
| 2004/0240050 A1 | 12/2004 | Ogihara |
| 2004/0241677 A1 | 12/2004 | Lin et al. |
| 2005/0089208 A1 | 4/2005 | Dong et al. |
| 2005/0109959 A1 | 5/2005 | Wasserman et al. |
| 2005/0117204 A1 | 6/2005 | Kinoshita et al. |
| 2005/0175992 A1 | 8/2005 | Aberl et al. |
| 2005/0286800 A1 | 12/2005 | Gouch |
| 2006/0002817 A1 | 1/2006 | Bohm |
| 2006/0003458 A1 | 1/2006 | Golovchenko et al. |
| 2006/0045505 A1 | 3/2006 | Zeineh |
| 2006/0051778 A1 | 3/2006 | Kallick |
| 2006/0063185 A1 | 3/2006 | Vannier |
| 2006/0079144 A1 | 4/2006 | Klisch et al. |
| 2006/0187442 A1 | 8/2006 | Chang et al. |
| 2006/0190226 A1 | 8/2006 | Jojic et al. |
| 2006/0222567 A1 | 10/2006 | Kloepfer et al. |
| 2006/0223052 A1 | 10/2006 | MacDonald et al. |
| 2006/0223165 A1 | 10/2006 | Chang et al. |
| 2006/0244964 A1 | 11/2006 | Cox et al. |
| 2007/0054350 A1 | 3/2007 | Walker, Jr. |
| 2007/0076190 A1 | 4/2007 | Nakaya et al. |
| 2007/0161075 A1 | 7/2007 | Gleich |
| 2007/0172956 A1 | 7/2007 | Magari et al. |
| 2007/0231914 A1 | 10/2007 | Deng et al. |
| 2007/0243117 A1 | 10/2007 | Wardlaw et al. |
| 2007/0250301 A1 | 10/2007 | Vaisberg et al. |
| 2007/0252984 A1 | 11/2007 | Van Beek et al. |
| 2008/0002868 A1 | 1/2008 | Ando et al. |
| 2008/0019584 A1 | 1/2008 | Lindberg et al. |

(56) References Cited

U.S. PATENT DOCUMENTS

| | | |
|---|---|---|
| 2008/0020128 A1 | 1/2008 | van Ryper |
| 2008/0059135 A1 | 3/2008 | Murugkar et al. |
| 2008/0118399 A1 | 5/2008 | Fleming |
| 2008/0153098 A1 | 6/2008 | Rimm et al. |
| 2008/0187466 A1 | 8/2008 | Wardlaw et al. |
| 2008/0212069 A1 | 9/2008 | Goldberg et al. |
| 2008/0260369 A1 | 10/2008 | Ibaraki |
| 2008/0273776 A1 | 11/2008 | Krief et al. |
| 2008/0305514 A1 | 12/2008 | Alford et al. |
| 2009/0066934 A1 | 3/2009 | Gao et al. |
| 2009/0074282 A1 | 3/2009 | Pinard et al. |
| 2009/0075324 A1 | 3/2009 | Pettersson |
| 2009/0086314 A1 | 4/2009 | Namba |
| 2009/0088336 A1 | 4/2009 | Burd et al. |
| 2009/0128618 A1 | 5/2009 | Fahn et al. |
| 2009/0185734 A1 | 7/2009 | Lindberg et al. |
| 2009/0191098 A1 | 7/2009 | Beard et al. |
| 2009/0195688 A1 | 8/2009 | Henderson et al. |
| 2009/0197272 A1 | 8/2009 | Hendriks et al. |
| 2009/0213214 A1 | 8/2009 | Yamada |
| 2009/0238438 A1 | 9/2009 | Wardlaw et al. |
| 2009/0258347 A1 | 10/2009 | Scott |
| 2009/0269799 A1 | 10/2009 | Winkelman et al. |
| 2009/0291854 A1 | 11/2009 | Wiesinger-Mayr et al. |
| 2010/0003265 A1 | 1/2010 | Scheffler |
| 2010/0068747 A1 | 3/2010 | Herrenknecht |
| 2010/0104169 A1 | 4/2010 | Yamada |
| 2010/0112631 A1 | 5/2010 | Hur et al. |
| 2010/0120129 A1 | 5/2010 | Amshey et al. |
| 2010/0136556 A1 | 6/2010 | Friedberger et al. |
| 2010/0136570 A1 | 6/2010 | Goldberg et al. |
| 2010/0152054 A1 | 6/2010 | Love |
| 2010/0157086 A1 | 6/2010 | Segale et al. |
| 2010/0172020 A1 | 7/2010 | Price |
| 2010/0192706 A1 | 8/2010 | Fairs |
| 2010/0232675 A1 | 9/2010 | Ortyn et al. |
| 2010/0234703 A1 | 9/2010 | Sterling et al. |
| 2010/0253907 A1 | 10/2010 | Korb |
| 2010/0254596 A1 | 10/2010 | Xiong |
| 2010/0256918 A1 | 10/2010 | Chen et al. |
| 2010/0265323 A1 | 10/2010 | Perz |
| 2010/0272334 A1 | 10/2010 | Yamada et al. |
| 2010/0295998 A1 | 11/2010 | Sakai et al. |
| 2010/0300563 A1 | 12/2010 | Ramunas et al. |
| 2011/0007178 A1 | 1/2011 | Kahlman |
| 2011/0009163 A1 | 1/2011 | Fletcher |
| 2011/0030458 A1 | 2/2011 | Park et al. |
| 2011/0059481 A1 | 3/2011 | Wardlaw et al. |
| 2011/0102571 A1 | 5/2011 | Yoneyama |
| 2011/0123398 A1 | 5/2011 | Carrhilo et al. |
| 2011/0144480 A1 | 6/2011 | Lu et al. |
| 2011/0149097 A1 | 6/2011 | Danuser et al. |
| 2011/0151502 A1 | 6/2011 | Kendall et al. |
| 2011/0178716 A1 | 7/2011 | Krockenberger et al. |
| 2011/0212486 A1 | 9/2011 | Yamada |
| 2011/0243794 A1 | 10/2011 | Wardlaw |
| 2011/0249910 A1 | 10/2011 | Henderson |
| 2011/0275111 A1 | 11/2011 | Pettigrew et al. |
| 2011/0301012 A1 | 12/2011 | Dolecek et al. |
| 2012/0002195 A1 | 1/2012 | Wu et al. |
| 2012/0013727 A1 | 1/2012 | Breniman et al. |
| 2012/0021951 A1 | 1/2012 | Hess et al. |
| 2012/0030618 A1 | 2/2012 | Leong et al. |
| 2012/0044342 A1 | 2/2012 | Hing et al. |
| 2012/0058504 A1 | 3/2012 | Li et al. |
| 2012/0092477 A1 | 4/2012 | Kawano et al. |
| 2012/0120221 A1 | 5/2012 | Dong et al. |
| 2012/0169863 A1 | 7/2012 | Bachelet et al. |
| 2012/0225446 A1 | 9/2012 | Wimberger-friedl et al. |
| 2012/0237107 A1 | 9/2012 | Tawfik et al. |
| 2012/0275671 A1 | 11/2012 | Eichhorn et al. |
| 2012/0312957 A1 | 12/2012 | Loney et al. |
| 2012/0320045 A1 | 12/2012 | Yao |
| 2013/0023007 A1 | 1/2013 | Zahniser et al. |
| 2013/0078668 A1 | 3/2013 | Levine et al. |
| 2013/0130262 A1 | 5/2013 | Battrell et al. |
| 2013/0169948 A1 | 7/2013 | Xie |
| 2013/0170730 A1 | 7/2013 | Yu et al. |
| 2013/0176551 A1 | 7/2013 | Wardlaw et al. |
| 2013/0177974 A1 | 7/2013 | Mamghani et al. |
| 2013/0203082 A1 | 8/2013 | Gonda et al. |
| 2013/0236566 A1 | 9/2013 | Higgins |
| 2013/0273968 A1 | 10/2013 | Rhoads et al. |
| 2013/0284924 A1 | 10/2013 | Mizuochi et al. |
| 2013/0290225 A1 | 10/2013 | Kamath et al. |
| 2013/0315466 A1 | 11/2013 | Drell |
| 2013/0323757 A1 | 12/2013 | Poher |
| 2014/0139625 A1 | 5/2014 | Mathuis et al. |
| 2014/0139630 A1 | 5/2014 | Kowalevicz |
| 2014/0185906 A1 | 7/2014 | Ding et al. |
| 2014/0186859 A1 | 7/2014 | Calderwood et al. |
| 2014/0205176 A1 | 7/2014 | Obrien et al. |
| 2014/0270425 A1 | 9/2014 | Kenny et al. |
| 2014/0273064 A1 | 9/2014 | Smith et al. |
| 2014/0273076 A1 | 9/2014 | Adams et al. |
| 2014/0322750 A1 | 10/2014 | Matsumoto et al. |
| 2014/0347459 A1 | 11/2014 | Greenfield et al. |
| 2014/0347463 A1 | 11/2014 | Lin |
| 2014/0353524 A1 | 12/2014 | Danuser et al. |
| 2014/0369586 A1 | 12/2014 | Rimm et al. |
| 2015/0022882 A1 | 1/2015 | Ue et al. |
| 2015/0029508 A1 | 1/2015 | Toyoda et al. |
| 2015/0037806 A1 | 2/2015 | Pollak et al. |
| 2015/0050643 A1 | 2/2015 | Matsumoto et al. |
| 2015/0124082 A1 | 5/2015 | Kato et al. |
| 2015/0183153 A1 | 7/2015 | Chan et al. |
| 2015/0190063 A1 | 7/2015 | Zakharov et al. |
| 2015/0246170 A1 | 9/2015 | Miao et al. |
| 2015/0278575 A1 | 10/2015 | Allano et al. |
| 2015/0302237 A1 | 10/2015 | Ohya et al. |
| 2015/0316477 A1 | 11/2015 | Pollak et al. |
| 2016/0042507 A1 | 2/2016 | Turner |
| 2016/0091484 A1 | 3/2016 | Yamada |
| 2016/0146750 A1 | 5/2016 | Hughes et al. |
| 2016/0168614 A1 | 6/2016 | Hunt |
| 2016/0187235 A1 | 6/2016 | Fine |
| 2016/0208306 A1 | 7/2016 | Pollak et al. |
| 2016/0246046 A1 | 8/2016 | Yorav-Raphael et al. |
| 2016/0250312 A1 | 9/2016 | Longley |
| 2016/0279633 A1 | 9/2016 | Bachelet et al. |
| 2017/0003490 A1 | 1/2017 | Sueki et al. |
| 2017/0052110 A1 | 2/2017 | Malissek et al. |
| 2017/0115271 A1 | 4/2017 | Xie et al. |
| 2017/0146558 A1 | 5/2017 | Ishii et al. |
| 2017/0160185 A1 | 6/2017 | Minemura et al. |
| 2017/0191945 A1 | 7/2017 | Zhang et al. |
| 2017/0205612 A1 | 7/2017 | Carloni |
| 2017/0218425 A1 | 8/2017 | Chen et al. |
| 2017/0292905 A1 | 10/2017 | Obrien et al. |
| 2017/0307496 A1 | 10/2017 | Zahniser et al. |
| 2017/0326549 A1 | 11/2017 | Jones et al. |
| 2017/0328924 A1 | 11/2017 | Jones et al. |
| 2018/0080885 A1 | 3/2018 | Ginsberg et al. |
| 2018/0156713 A1 | 6/2018 | Berezhna et al. |
| 2018/0171404 A1 | 6/2018 | Del Favero et al. |
| 2018/0172578 A1 | 6/2018 | Fiolka |
| 2018/0246313 A1 | 8/2018 | Eshel et al. |
| 2018/0259318 A1 | 9/2018 | Yelin et al. |
| 2018/0296102 A1 | 10/2018 | Satish et al. |
| 2018/0297024 A1 | 10/2018 | Tran |
| 2019/0002950 A1 | 1/2019 | Pollak et al. |
| 2019/0087953 A1 | 3/2019 | Yorav-Raphael |
| 2019/0110718 A1 | 4/2019 | Brittenham et al. |
| 2019/0130567 A1 | 5/2019 | Greenfield |
| 2019/0145963 A1 | 5/2019 | Zait |
| 2019/0266723 A1 | 8/2019 | Blanchard et al. |
| 2019/0302099 A1 | 10/2019 | Pollak |
| 2019/0324255 A1 | 10/2019 | Pergande et al. |
| 2019/0347467 A1 | 11/2019 | Ohsaka et al. |
| 2020/0034967 A1 | 1/2020 | Yorav-Raphael |
| 2020/0049970 A1 | 2/2020 | Eshel |
| 2020/0111209 A1 | 4/2020 | Greenfield |
| 2020/0249458 A1 | 8/2020 | Eshel |

(56) References Cited

U.S. PATENT DOCUMENTS

| | | | | |
|---|---|---|---|---|
| 2020/0300750 A1* | 9/2020 | Eshel | .................... | G06T 7/0016 |
| 2021/0069696 A1 | 3/2021 | Li et al. | | |
| 2022/0189016 A1 | 6/2022 | Barnes et al. | | |

FOREIGN PATENT DOCUMENTS

| | | |
|---|---|---|
| CN | 101403650 A | 4/2009 |
| CN | 101438143 A | 5/2009 |
| CN | 101501785 A | 8/2009 |
| CN | 102027368 A | 4/2011 |
| CN | 102282467 A | 12/2011 |
| CN | 102933964 A | 2/2013 |
| CN | 104094118 A | 10/2014 |
| CN | 104471389 A | 3/2015 |
| CN | 105467109 A | 4/2016 |
| CN | 105556276 A | 5/2016 |
| CN | 108474934 A | 8/2018 |
| EP | 0073551 A2 | 3/1983 |
| EP | 0479231 A1 | 4/1992 |
| EP | 0744191 A2 | 11/1996 |
| EP | 1 381 229 A1 | 1/2004 |
| EP | 1698883 A1 | 9/2006 |
| EP | 2145684 A2 | 1/2010 |
| EP | 2 211 165 A2 | 7/2010 |
| EP | 3001174 A1 | 3/2016 |
| EP | 3123927 | 2/2017 |
| EP | 3482189 A1 | 5/2019 |
| EP | 1 873 232 B1 | 2/2020 |
| GB | 2329014 A | 3/1999 |
| JP | 60-162955 A | 8/1985 |
| JP | 61-198204 A | 9/1986 |
| JP | 7-504038 A | 4/1995 |
| JP | H08-313340 A | 11/1996 |
| JP | 9-54083 A | 2/1997 |
| JP | 11-500832 A | 1/1999 |
| JP | H11-73903 A | 3/1999 |
| JP | 2000-199845 A | 7/2000 |
| JP | 2002-516982 A | 6/2002 |
| JP | 2004-144526 A | 5/2004 |
| JP | 2004-257768 A | 9/2004 |
| JP | 2004-532410 A | 10/2004 |
| JP | 2005-218379 A | 8/2005 |
| JP | 2006-506607 A | 2/2006 |
| JP | 2006-301270 A | 11/2006 |
| JP | 2007-40814 A | 2/2007 |
| JP | 2008-5768 A | 1/2008 |
| JP | 2008-20498 A | 1/2008 |
| JP | 2009-180539 A | 8/2009 |
| JP | 2009-233927 A | 10/2009 |
| JP | 2009-268432 A | 11/2009 |
| JP | 2011-95225 A | 5/2011 |
| JP | 2013-27368 A | 2/2013 |
| JP | 2013-515264 A | 5/2013 |
| JP | 2013-517460 A | 5/2013 |
| JP | 2013-541767 A | 11/2013 |
| JP | 2014-41139 A | 3/2014 |
| JP | 2014-44050 A | 3/2014 |
| JP | 2015-21938 A | 2/2015 |
| JP | 2015-57600 A | 3/2015 |
| JP | 2016-70658 A | 5/2016 |
| JP | 2016-71588 A | 5/2016 |
| JP | 2016-528506 A | 9/2016 |
| JP | 2016-189701 A | 11/2016 |
| JP | 2017-67524 A | 4/2017 |
| JP | 2017-209530 A | 11/2017 |
| JP | 2018-525611 A | 9/2018 |
| JP | 2018-534605 A | 11/2018 |
| JP | 2019-528459 A | 10/2019 |
| JP | 6952683 B2 | 10/2021 |
| RU | 2289133 C1 | 12/2006 |
| RU | 2402006 C1 | 10/2010 |
| WO | 1985/005446 | 12/1985 |
| WO | 1996/001438 | 1/1996 |
| WO | 1996/012981 | 5/1996 |
| WO | 1996/013615 | 5/1996 |
| WO | 2000/006765 | 2/2000 |
| WO | 2000/052195 | 9/2000 |
| WO | 2000/055572 | 9/2000 |
| WO | 2003/056327 | 7/2003 |
| WO | 2003/065358 A2 | 8/2003 |
| WO | 2003/073365 | 9/2003 |
| WO | 2003/081525 | 10/2003 |
| WO | 2004/020112 A1 | 3/2004 |
| WO | 2004/111610 | 12/2004 |
| WO | 2005/121863 | 12/2005 |
| WO | 2006/121266 | 11/2006 |
| WO | 2008/063135 | 5/2008 |
| WO | 2009/136570 A1 | 11/2009 |
| WO | 2009/136573 A1 | 11/2009 |
| WO | 2010/036827 | 4/2010 |
| WO | 2010/056740 | 5/2010 |
| WO | 2010/116341 | 10/2010 |
| WO | 2010/126903 | 11/2010 |
| WO | 2010/137543 A1 | 12/2010 |
| WO | 2011/056658 | 5/2011 |
| WO | 2011/076413 | 6/2011 |
| WO | 2011/123070 | 10/2011 |
| WO | 2011/143075 | 11/2011 |
| WO | 2012/000102 | 1/2012 |
| WO | 2012/029269 | 3/2012 |
| WO | 2012/030313 | 3/2012 |
| WO | 2012/090198 | 7/2012 |
| WO | 2012/154333 | 11/2012 |
| WO | 2013/041951 | 3/2013 |
| WO | 2013/098821 | 7/2013 |
| WO | 2013/102076 A1 | 7/2013 |
| WO | 2014/146063 A2 | 9/2014 |
| WO | 2014/159620 | 10/2014 |
| WO | 2014/188405 | 11/2014 |
| WO | 2015/001553 | 1/2015 |
| WO | 2015/029032 | 3/2015 |
| WO | 2015/089632 | 6/2015 |
| WO | 2016/021311 A1 | 2/2016 |
| WO | 2016/030897 | 3/2016 |
| WO | 2016/203320 A2 | 12/2016 |
| WO | 2017/046799 | 3/2017 |
| WO | 2017/168411 | 10/2017 |
| WO | 2017/195205 | 11/2017 |
| WO | 2017/195208 | 11/2017 |
| WO | 2018/009920 | 1/2018 |
| WO | 2018/102748 A1 | 6/2018 |
| WO | 2019/035084 | 2/2019 |
| WO | 2019/097387 | 5/2019 |
| WO | 2019/102277 | 5/2019 |
| WO | 2019/198094 | 10/2019 |
| WO | 2021/079305 | 4/2021 |
| WO | 2021/079306 | 4/2021 |
| WO | 2021/116957 A1 | 6/2021 |
| WO | 2021/116962 A1 | 6/2021 |
| WO | 2022/009104 A2 | 1/2022 |

OTHER PUBLICATIONS

An Office Action dated Aug. 2, 2022, which issued during the prosecution of Japanese Patent Application No. 2021-145455.
An Examination Report dated Aug. 25, 2022, which issued during the prosecution of Australian Patent Application No. 2017263807.
An Office Action dated Aug. 30, 2022 which issued during the prosecution of Japanese Patent Application No. 2020-526176.
An Office Action dated Sep. 13, 2022 which issued during the prosecution of Japanese Patent Application No. 2021-157849.
Hideto Miura, "How to regard as how to consider the poikilocyte in urine an erroneous decision factor", Modern Medical Laboratory, Sep. 1, 2002, vol. 30, No. 9, pp. 862-864 (6 pages total).
Jun Hashimoto, "Morphological Studies of Urinary Red Blood Cells in Renal and Urinary Tract Disorders (II) Use of Wright's Stain in Differential Diagnosis between Renal and Urinary Tract Disorders" Kawasaki Medical Congress Magazine, Mar. 1989, vol. 15, No. 1, pp. 94-101 (9 pages total).
D F Birch et al., "The research on the differential diagnosis of the kidney urinary tract obstacle by glomerular or non-glomerular", Lancet, Oct. 20, 1979, vol. 2, No. 8147, pp. 845-846 (3 pages total).

(56) References Cited

OTHER PUBLICATIONS

A First Examination Report dated Sep. 19, 2022, which issued during the prosecution of Indian Patent Application No. 201817040226.
An Office Action dated Oct. 3, 2022 which issued during the prosecution of U.S. Appl. No. 16/763,810.
An Office Action dated Oct. 25, 2022 which issued during the prosecution of Canadian Application No. 2,998,829 (SDX044).
An Office Action dated Oct. 5, 2022 which issued during the prosecution of Brazilian Application No. 112018005099-7.
An Office Action dated Nov. 25, 2022 which issued during the prosecution of Brazilian Application No. 122020017765-9.
An Office Action dated Dec. 9, 2022 which issued during the prosecution of U.S. Appl. No. 17/083,647.
An Office Action dated Dec. 28, 2022 which issued during the prosecution of Russian Patent Application No. 2022112399.
An Office Action dated Dec. 28, 2022 which issued during the prosecution of Russian Patent Application No. 2022112393.
An Office Action dated Jan. 6, 2023 which issued during the prosecution of U.S. Appl. No. 17/063,320.
An Office Action dated Sep. 2, 2022 which issued during the prosecution of U.S. Appl. No. 17/063,320.
An Office Action dated Jan. 5, 2023 which issued during the prosecution of Chinese Patent Application No. 201880079888.9.
An Examination Report dated Jan. 23, 2023, which issued during the prosecution of Australian Patent Application No. 2022200112.
An Office Action dated Jan. 19, 2023 which issued during the prosecution of U.S. Appl. No. 17/490,767.
Communication dated Feb. 22, 2023 issued by the Canadian Patent Office in application No. 3,081,669.
Communication dated Jul. 12, 2023 issued by the Canadian Patent Office in application No. 3,155,820.
Communication dated Jul. 17, 2023 issued by the Canadian Patent Office in application No. 3,155,821.
Communication dated Jul. 3, 2023 issued by the United States Patent and Trademark Office in U.S. Appl. No. 17/568,858.
Communication dated Jun. 22, 2023 issued by the Canadian Office Action in application No. 3,160,697.
Communication dated Jun. 8, 2023, issued by the Canadian Patent Office in application No. 3,160,692.
Communication dated Jun. 9, 2023 issued by the Canadian Patent Office in application No. 3,160,688.
Communication dated Mar. 17, 2023 issued by the United States Patent and Trademark Office in U.S. Appl. No. 17/083,647.
Communication dated Mar. 2, 2023 issued in the Canadian Patent Office in application No. 3,018,536.
Communication dated Mar. 20, 2023 issued by the European Patent Office in application No. 22209948.3.
Communication dated Mar. 27, 2023 issued by the Brazilian Patent Office in application No. BR122020017765-9.
Communication dated Mar. 27, 2023 issued by the United States Patent and Trademark Office in U.S. Appl. No. 16/763,810.
Communication dated Mar. 3, 2022 issued by the United States Patent and Trademark Office in U.S. Appl. No. 17/063,320.
Communication dated Mar. 3, 2023 issued by the United States Patent and Trademark Office in U.S. Appl. No. 17/082,483.
Communication dated Mar. 7, 2023 issued by the Japanese Patent Office in application No. 2021-157849.
Communication dated Nov. 25, 2022 issued by the United States Patent and Trademark Office in U.S. Appl. No. 17/082,483.
Hirota, T., et al., "Kusanon AR Poisoning Complicated by Heinz Body Hemolytic Anemia", Japanese Association for Acute Medicine Magazine, vol. 12, No. 12, Dec. 15, 2001, (1 page total).
Notice of Allowance dated Apr. 12, 2023 issued by the United States Patent and Trademark Office in U.S. Appl. No. 16/088,321.
Onodera, M., "Organ Derangement", Medicina, Sep. 9, 2005, vol. 42, No. 9, pp. 1582-1584 (5 pages total).
Sawhney, A.K., et al., "Erythrocyte Alterations Induced by Malathion in Channa punctatus (Bloch)", Bull. Environ. Contam. Toxicol., 2000, vol. 64, pp. 395-405.

Takakusaki, T., "Shape Change of Red Cell Ghost and ATP", The Kitakanto Medical Journal, 1960, vol. 10, Issue 4, pp. 522-531 (11 pages total).
Tyulina, O., et al., "Erythrocyte and plasma protein modification in alcoholism: A possible role of acctaldehyde", Biochimica et Biophysica Acta, vol. 1762, 2006, pp. 558-563 (6 pages total).
United States Second Notice of Allowance issued Aug. 23, 2023 in U.S. Appl. No. 17/490,767.
United States Notice of Allowance issued May 15, 2023 in U.S. Appl. No. 17/490,767.
An Examination Report issued Aug. 16, 2023, in Australian Patent Application No. 2018369859.
Canadian Office Action issued Aug. 25, 2023 in Application No. 3,160,702.
United States Office Action issued May 30, 2023 in U.S. Appl. No. 17/082,615.
A Hearing Notice issued by the Indian Patent Office on Aug. 29, 2023 for IN 201817012117.
A Hearing Notice issued by the Indian Patent Office on Sep. 1, 2023 for IN 201817036130.
United States Office Action issued Sep. 14, 2023 in U.S. Appl. No. 17/083,647.
United States Office Action issued Sep. 14, 2023 in U.S. Appl. No. 17/063,320.
Office Action dated Dec. 7, 2023 which issued during the prosecution of Canadian Application No. 3,081,669.
A Summons to an Oral Hearing issued by the European Patent Office on Oct. 5, 2023 for Application No. 17728277.9.
A Decision to Refuse issued on Oct. 3, 2023 for Japanese Patent Application No. 2021-157849.
Canadian Office Action issued Oct. 13, 2023 in Application No. 2,998,829.
United States Notice of Allowance issued Oct. 12, 2023 in U.S. Appl. No. 17/568,858.
United States Office Action issued Oct. 17, 2023 in U.S. Appl. No. 17/082,615.
A Hearing Notice issued by the Indian Patent Office on Nov. 9, 2023 for IN 201817040226.
Canadian Office Action issued Dec. 19, 2023 in Application No. 3,018,536.
An Office Action dated Dec. 21, 2023 which issued during the prosecution of Brazilian Application No. 112018 072627 3.
United States Office Action issued Jan. 9, 2024 in U.S. Appl. No. 18/203,109.
"Blood specimens:Microscopic Examination", Centers for Disease Control and Prevention CDC, Diagnostic Procedures, 2009, <http://www.dpd.cdc.gov/dpdx/HTML/Frames/DiagnosticProcedures/body_dp_bloodexamin.htm>.
Agero, U., Mesquita, L.G., Neves, B.R.A., Gazzinelli, R.T. and Mesquita, O.N., 2004. Defocusing microscopy. Microscopy research and technique, 65(3), pp. 159-165.
Ahirwar, Neetu et al., "Advanced Image Analysis Based System for Automatic Detection and Classification of Malarial Parasite in Blood Images," International Journal of Information Technology and Knowledge Management Jan.-Jun. 2012, vol. 5, No. 1, pp. 59-64, Serial Publications Pvt. Ltd, India.
An International Search Report and a Written Opinion both dated Jan. 23, 2017. which issued during the prosecution of Applicant's PCT/IL2016/051025.
An International Search Report and Written Opinion in International Application No. PCT/IB2018/058861, issued on Apr. 8, 2019.
An International Search Report and Written Opinion, dated Aug. 30, 2017 from the International Bureau in counterpart International application No. PCT/IL2017/050526.
An International Search Report and Written Opinion, dated Aug. 8, 2017 from the International Bureau in counterpart International application No. PCT/IL2017/050523.
An International Search Report and Written Opinion, dated May 18, 2017 from the International Bureau in counterpart International application No. PCT/IL2017/050363.
Anand, A., et al. "Automatic Identification of Malaria-Infected RBC with Digital Holographic Microscopy Using Correlation Algorithms." Photonics Journal, IEEE 4.5 (2012): 1456-1464.

(56) References Cited

OTHER PUBLICATIONS

Bacus, J.W., 1985. Cytometric approaches to red blood cells. Pure and Applied AL Chemistry, 57(4), pp. 593-598.
Biéler, Sylvain et al. "Improved detection of Trypanosoma brucei by lysis of red blood cells, concentration and LED fluorescence microscopy"; Acta Tropica; vol. 121, Issue 2, Feb. 2012, pp. 135-140.
Bravo-Zanoguera, M.E., Laris, C.A., Nguyen, L.K., Oliva, M. and Price, J.H., 2007. Dynamic autofocus for continuous-scanning time-delay-and-integration image acquisition in automated microscopy. Journal of biomedical optics, 12(3), pp. 034011-034011.
Brenner et al., An Automated Microscope for Cytologic Research a Preliminary Evaluation, [The Journal of Histochecmistry and Cytochemistry, vol. 24, No. 1, pp. 100-111, 1976.
Briggs, C., et al., "Continuing developments with the automated platelet count", Blackwell Publishing Ltd, International Journal of Laboratory Hematology, Jan. 18, 2007, pp. 77-91, vol. 29 (15 pages total).
Centers for Disease Control and Prevention. DPDx—Laboratory Identification of Parasitic Diseases of Public Health Concern <http://www.cdc.gov/dpdx/diagnosticProcedures/blood/microexam.html>, Nov. 29, 2013.
Cervantes, Serena , Jacques Prudhomme, David Carter, Krishna G Gopi, Qian Li, Young-Tae Chang, and Karine G Le Roch, High-content live cell imaging with RNA probes: advancements in high-throughput antimalarial drug discovery, BMC Cell Biology 2009, 10:45, https://bmcmolcellbiol.biomedcentral.com/track/pdf/10.1186/1471-2121-10-45 (Jun. 10, 2009).
Chiodini, P.L. et al., "Rapid diagnosis of malaria by fluorescence microscopy"; The Lancet, vol. 337, Issue 8741, p. 624-625, Mar. 9, 1991.
Chong, Shau Poh, Shilpa Pant, and Nanguang Chen. "Line-scan Focal Modulation Microscopy for Rapid Imaging of Thick Biological Specimens." SPIE/OSA/IEEE Asia Communications and Photonics. International Society f or Optics and Photonics, 2011.
Emma Eriksson et al: "Automated focusing of nuclei for time lapse experiments on single cells using holographic optical tweezers", Optics Express , vol. 17, No. 7 , 2 Mar. 4, 2009, pp. 5585-5594.
F. Boray Tek et al. "Parasite detection and identification for automated thin blood film malaria diagnosis"; Computer Vision and Image Understanding vol. 114, Issue 1, Jan. 2010, pp. 21-32.
Fohlen-Walter, Anne PhD, et al., "Laboratory Identification of Cryoglobulinemia From Automated Blood Cell Counts, Fresh Blood Samples, and Blood Films", American Society for Clinical Pathology, Am J Clin Pathol, 2002, pp. 606-614, vol. 117 (9 pages total).
Frean, John. "Microscopic Determination of Malaria Parasite Load: Role of Image Analysis." Microscopy: Science, technology, Applications, and Education (2010): 862-866.
Gallo, V., Skorokhod, O.A., Schwarzer, e, and Arese, P. "Simultaneous determination of phagocytosis of Plasmodium falciparum-parasitized and non-parasitized red blood cells by flow cytometry"; Malaria Journal 2012 11:428.
Garcia, et al. "Laboratory Diagnosis of Blood-borne Parasitic Diseases; Approved Guideline"; NCCLS Documents M115-a, Jun. 2000.
Gordon, Andrew et al. "Single-cell quantification of molecules" Nature Methods 4, Jan. 21, 2007, pp. 175-181.
Gordon, Andrew et al. Supplementary Note to Gordon et al: "Single-cell quantification of molecules" Nature Methods, Jan. 21, 2007, pp. 1-35.
Groen, F.C.A., et al. "A comparison of different focus functions for use in autofocus algorithms", Cytometry, Alan Liss, New York, US vol. 6, No. 2, Mar. 1, 1985 (Mar. 1, 1985) pp. 81-91.
Guy, Rebecca, Paul Liu, Peter Pennefather and Ian Crandall, "The use of fluorescence enhancement to improve the microscopic diagnosis of falciparum malaria", Malaria Journal 2007 6:89, https://malariajournal.biomedcentral.com/articles/10.1186/1475-2875-6-89, (Jul. 9, 2007).
Houri-Yafin, A., et al. "An enhanced computer vision platform for clinical diagnosis of malaria" Malaria Control and Elimination, 2016, p. 138, Vo. 5, Issue 1, omics International, India.

Jager et al. "Five-minute Giemsa stain for rapid detection of malaria parasites in blood smears", Tropical Doctor, Vo. 41, pp. 33-35, Jan. 2011.
Jahanmehr,S A H et al., "Simple Technique for Fluorescence Staining of Blood Cells with Acridine Orange", Journal of Clinical Pathology, Feb. 12, 1987, pp. 926-929 (4 pages total).
Joanny, Fanny, Helda Jana, and Benjamin Mordmllera, "In Vitro Activity of Fluorescent Dyes against Asexual Blood Stages of Plasmodium falciparum" 'DOI: 10.1128/AAC.00709-12.
Kawamoto, F. and P.F.Billingsley, "Rapid diagnosis of malaria by fluorescence microscopy", Parasitology Today, 8.2 (1992): 69-71.
Kawamoto, F. "Rapid diagnosis of malaria by fluorescence microscopy with light microscope and interference filter", The Lancet, vol. 337, pp. 200-202, Jan. 26, 1991.
Keiser, J. et al., "Acridine Orange for malaria diagnosis: its diagnostic performance, its promotion and implementation in Tanzania, and the implications for malaria control", Annals of Tropical Medicine and parasitology, 96.7 (2002): 643-654.
Knesel, "Roche Image Analysis Systems, Inc.", Acta Cytologica, vol. 40, pp. 60-66, (1996).
Kumar, Amit et al. "Enhanced Identification of Malarial Infected Objects using Otsu Algorithm from Thin Smear Digital Images." International Journal of Latest Research in Science and Technology vol. 1, Issue 2 :pp. 159-163, Jul.-Aug. 2012).
Le, Minh-Tam et al., "A novel semi-automatic image processing approach to determine Plasmodium falciparum parasitemia in Giemsa-stained thin blood smears", BMC Cell Biology, published Mar. 28, 2008.
Leif, "Methods for Preparing Sorted Cells as Monolayer Specimens", Springer Lab Manuals, Section 7—Chapter 5 pp. 592-619, (2000).
Life Technologies Corporation, "Counting blood cells with Countless Automated Cell Counter" found at http://www.lifetechnologies.com/content/dam/LifeTech/migration/files/cell-tissue-analysis/pdfs.par.83996.file.dat/w-082149-countless-application-blood-cells.pdf, four pages, (2009).
Matcher, S.J., et al. "Use of the water absorption spectrum to quantify tissue chromophore concentration changes in near-infrared spectroscopy", Physics in Medicine & Biology, vol. 39, No. 1, 1994 pp. 177-196, IOP Publishing Ltd., UK.
Mendiratta, D.K. et al. Evaluation of different methods for diagnosis of P. falciparum malaria; Indian J Med Microbiol. Jan. 2006;24(1):49-51.
Merchant et al. , "Computer-Assisted Microscopy", The essential guide to image processing, Chapter 27, pp. 777-831, Academic Press, (2009).
Moody , "Rapid Diagnostic Tests for Malaria Parasites", Clinical Microbiology Reviews, vol. 15, No. 1, pp. 66-78, 12 (2002).
Moon S, Lee S, Kim H, Freitas-Junior LH, Kang M, Ayong L, et al. (2013) An Image Analysis Algorithm for Malaria Parasite Stage Classification and Viability Quantification. PLoS One 8(4): e61812. https://doi.org/10.1371/journal.pone.0061812.
Ortyn, William E.,et al. "Extended Depth of Field Imaging for High Speed Cell Analysis." Cytometry Part A 71.4, 2007): 215-231.
Osibote, O. A., et al. "Automated focusing in bright-field microscopy for tuberculosis detection", Journal of Microscopy 240.2 (2010)pp. 155-163.
Pasini, Erica M. et al. "A novel live-dead staining methodology to study malaria parasite viability"; Malaria Journal 2013 12:190.
Piruska, Aigars et al., "The autofluorescence of plastic materials and chips measured under laser irradiation" Lab on a Chip, 2005, 5, 1348-1354, published Nov. 1, 2005.
Poon et al., "Automated Image Detection and Segmentation in Blood Smears", [Cytometry 1992 13:766-774.
Purwar, Yashasvi, et al. "Automated and Unsupervised Detection of Malarial Parasites in Microscopic Images." Malaria Journal 10.1 (2011): 364.
Rappaz, Benjamin et al., "Comparative study of human erythrocytes by digital holographic microscopy, confocal microscopy, and impedance volume analyzer" Cytometry Part A, 2008, vol. 73, Issue 10, pp. 895-903, John Wiley & Sons, US.

(56) References Cited

OTHER PUBLICATIONS

Roma, P. M. S., et al . "Total three-dimensional imaging of phase objects using defocusing microscopy: Application to red blood cells." Applied Physics Letters 104,25 (2014): 251107.
Ross, Nichoals E., et al., "Automated image processing method for the diagnosis and classification of malaria on thin blood smears", Medical and Biological Engineering and Computing, May 2006, vol. 44, Issue 5, pp. 427-436, Springer Publishing Company, US.
Sheikh , H., Bin Zhu, Micheli-Tzanakou, E. (1996) "Blood cell identification using neural networks." Proceedings of the IEEE 22nd Annual Northeast Bioengineering Conference; pp. 119-120.
Shen, Feimo, Louis Hodgson and Klaus Hahn, "Digital autofocus method for automated microscopy", Methods in Enzymology vol. 414, 2006, pp. 620-632.
Shute G. T. and T. M. Sodeman, "Identification of malaria parasites by fluorescence microscopy and acridine orange staining", Bulletin of the World Health Organ. 1973; 48(5): 591-596.
Sun, Yu, S. Duthaler and B.J. Nelson, "Autofocusing algorithm selection in computer microscopy", 2005 IEEE/RSJ International Conference on Intelligent Robots and Systems.
Tek, F. Boray, Andrew G. Dempster, and Izzet Kale. "Computer Vision for Microscopy Diagnosis of Malaria." Malaria Journal 8.1 (2009): 153.
Thung, Ferdian, and Iping Supriana Suwardi. "Blood Parasite Identification Using Feature Based Recognition." Electrical Engineering and Informatics (ICEEI), 2011 International Conference on. IEEE, 2011.
U.S. Appl. No. 61/427,809, filed Dec. 29, 2010. (CAT-1).
U.S. Appl. No. 61/870,106, filed Aug. 26, 2013. (CAT-2).
U.S. Appl. No. 62/042,388, filed Aug. 27, 2014 (CAT-2).
UNITAID Malaria Diagnostic Technology And Market Landscape, 2nd Edition (2014).
Wissing, Frank et al. "Illumination of the Malaria Parasite *Plasmodium falciparum* Alters Intracellular pH", Implications for Live Cell Imaging; published Jul. 24, 2002,JBS Papers in Press, vol. 277 No. 40, pp. 27747-37755.
Wright, J H. "A Rapid Method for the Differential Staining of Blood Films and Malarial Parasites" Journal of medical research vol. 7,1 (1902): 138-44.
Wu, Caicai et al., "Feasibility study of the spectroscopic measurement of oxyhemoglobin using whole blood without pre-treatment", The Analyst, Mar. 1998, pp. 477-481, vol. 123 (5 pages total).
Wu, Qiang, Fatima Mechant, and Kenneth Castleman. Microscope Image Processing. Chapter 16, Autofocusing, pp. 441-467, Academic Press, 2010.
Xu, Lili, Asok Chaudhuri, "Plasmodium yoelii: A differential fluorescent technique using Acridine Orange to identify infected erythrocytes and reticulocytes in Duffy knockout mouse", Experimental Parasitology, vol. 110, Issue 1, May 2005, pp. 80-87, https://www.sciencedirect.com/science/article/pii/S001448940500038X, (May 31, 2005).
Yang, Ming, and Li Luo. "A Rapid Auto-Focus Method in Automatic Microscope." Signal Processing, 2008. ICSP 2008. 9th International Conference on. IEEE,2008.
Yao, LN et al. "Pathogen identification and clinical diagnosis for one case infected with Babesia". Zhongguo ji sheng chong xue yu ji sheng chong bing za zhi Chinese journal of parasitology parasitic diseases, Aug. 2012.
Yazdanfar, S., Kenny, K.B., Tasimi, K., Corwin, A.D., Dixon, E.L. and Filkins, R.J., 2008. Simple and robust image-based autofocusing for digital microscopy. Optics express, 16(12), pp. 8670-8677.
Zahniser et al., Automated Slide Preparation System for the Clinical Laboratory, Cytometry, vol. 26, No. 10, pp. 60-64, (1996).
A European Examination Report dated Dec. 9, 2019. which issued during the prosecution of Applicant's European App No. 16782094.3.
Notice of Allowance dated Mar. 2, 2020, which issued during the prosecution of U.S. Appl. No. 16/657,473.
A European Examination Report dated Feb. 1, 2019. which issued during the prosecution of Applicant's European App No. 17717000.8.
A European Examination Report dated Sep. 3, 2019. which issued during the prosecution of Applicant's European App No. 17717000.8.
A European Examination Report dated Apr. 8, 2020. which issued during the prosecution of Applicant's European App No. 17717000.8.
A European Examination Report dated Apr. 6, 2020. which issued during the prosecution of Applicant's European App No. 17726036.1.
A European Examination Report dated Feb. 11, 2020. which issued during the prosecution of Applicant's European App No. 17728277.9.
An Office Action dated Aug. 24, 2020 for U.S. Appl. No. 16/098,893.
A Chinese Office Action and dated May 22, 2020. which issued during the prosecution of Chinese Application No. 201680053431.1.
A Restriction Requirement issued by the USPTO on Aug. 24, 2020 for U.S. Appl. No. 16/088,321.
Saraswat, et al. "Automated microscopic image analysis for leukocytes identification: A survey", ABV-Indian Institute of Information Technology and Management, Gwalior, India.
Hiremath, P.S,. et al., "Automated Identification and Classification of White Blood Cells (Leukocytes) in Digital Microscopic Images", IJCA Special Issue on "Recent Trends in Image Processing and Pattern Recognition" RTIPPR, 2010.
Witt, et al. "Establishing traceability of photometric absorbance values for accurate measurements of the haemoglobin concentration in blood.",Metrologia 50 (2013) 539-548.
Putzu, et al., "Leucocyte classification for leukaemia detection using image processing techniques.", Artificial Intelligence in Medicine, vol. 63, No. 3, Nov. 1, 2014.
Varga, et al., "An automated scoring procedure for the micronucleus test by image analysis,",Mutagenesis vol. 19 No. 5 pp. 391--397, 2004.
Ran, Qiong et al. "Spatial-spectral blood cell classification with microscopic hyperspectral imagery", Proc. SPIE 10461, AOPC 2017: Optical Spectroscopy and Imaging, 1046102 (Oct. 24, 2017).
Omucheni et al. "Application of principal component analysis to multispectral-multimodal optical image analysis for malaria diagnostics", Malaria Journal 2014, 13:485 http://www.malariajournal.com/content/13/1/485.
Ben-Suliman—2018—Computerized Counting-Based System for Acute Lymphoblastic Leukemia Detection in Microscopic Blood Images: 27th International Conference on Artificial Neural Networks, Rhodes, Greece, Oct. 4-7, 2018, Proceedings, Part II.
An Office Action dated Dec. 8, 2020 for Japanese Patent Application No. 2018/512961.
An Examination Report issued on Dec. 7, 2020 for Australian Patent Application No. 2016322966.
An Office Action dated Jan. 11, 2021 for U.S. Appl. No. 16/098,893.
An Examination Report issued on Apr. 29, 2021 for Australian Patent Application No. 2016322966.
International Search Report issued for PCT Application No. PCT/IB2020/059924 on Mar. 22, 2021.
International Search Report issued for PCT Application No. PCT/IB2020/059925 on Mar. 26, 2021.
Invitation to pay fees and Partial Search Report issued for PCT Application No. PCT/IB2020/059924 on Jan. 28, 2021.
Invitation to pay fees and Partial Search Report issued for PCT Application No. PCT/IB2020/059925 on Feb. 4, 2021.
A Japanese Office Action dated Mar. 30, 2021. which issued during the prosecution of Application No. 2018/558180.
An Office Action dated Mar. 9, 2021 for U.S. Appl. No. 16/088,321.
An Office Action dated Jan. 29, 2021 for U.S. Appl. No. 16/099,270.
Bovik, Alan C., et. "The Essential Guide to Image Processing", Chapter 27, "Computer Assisted Microscopy", pp. 777-831; Academic Press, 2009 (Merchant).
Communication dated Nov. 18, 2014 from the Canadian Patent Office in application No. 2,655,024.

(56) References Cited

OTHER PUBLICATIONS

Laboratory diagnosis of blood-borne parasitic diseases: approved guideline, 2000—NCCLS (CAT-1).
Price Jeffrey H. and David A. Gough, "Comparison of phase-contrast and fluorescence digital autofocus for scanning microscopy", Cytometry 16.4 (1994) 283-297.
Vink, J.P. et al., "An automatic vision-based malaria diagnosis system", Journal of Microscopy 250.3 (2013):166-178.
An International Search Report and Written Opinion for Application No. PCT/IB2020/061731 issued on Feb. 22, 2021.
Invitation to pay fees and Partial Search Report issued for PCT Application No. PCT/IB2020/061732 on Mar. 10, 2021.
Invitation to pay fees and Partial Search Report issued for PCT Application No. PCT/IB2020/061736 on Mar. 12, 2021.
Invitation to pay fees and Partial Search Report issued for PCT Application No. PCT/IB2020/061728 on Mar. 15, 2021.
International Search Report issued for PCT Application No. PCT/IB2020/061724 on Mar. 10, 2021.
An International Search Report and Written Opinion for PCT Application No. PCT/IB2020/061732 mailed on May 7, 2021.
International Search Report and Written Opinion for PCT Application No. PCT/IB2020/061728 mailed on May 7, 2021.
International Search Report and Written Opinion for PCT Application No. PCT/IB2020/061736 mailed on May 3, 2021.
Non-Final Office Action dated Jun. 17, 2021 which issued during the prosecution of U.S. Appl. No. 16/851,410.
A Final Office Action dated Jun. 17, 2021 which issued during the prosecution of U.S. Appl. No. 16/088,321.
Notice of Allowance dated May 19, 2021 which issued during the prosecution of U.S. Appl. No. 16/099,270.
A Restriction Requirement issued by the USPTO on Oct. 19, 2020 for U.S. Appl. No. 16/099,270.
An Extended European Search Report issued for European Patent Application No. 21164814.2 on Jun. 9, 2021.
Third Office Action dated Jul. 12, 2021 which issued during the prosecution of Chinese Patent Application No. 201680053431.1.
Non-Final Office Action dated Jul. 27, 2021, which issued during the prosecution of U.S. Appl. No. 16/851,686.
Non-Final Office Action dated Aug. 19, 2021, which issued during the prosecution of U.S. Appl. No. 16/098,893.
Non-Final Office Action dated Sep. 1, 2021 which issued during the prosecution of U.S. Appl. No. 16/088,321.
First Office Action dated Aug. 4, 2021 which issued during the prosecution of Chinese Patent Application No. 201780027908.3.
An Examination Report dated Mar. 4, 2021 which issued during the prosecution of Indian Patent Application No. 201817036130.
An Examination Report dated May 5, 2021 which issued during the prosecution of Indian Patent Application No. 201817012117.
Non-Final Office Action dated Oct. 6, 2021, which issued during the prosecution of U.S. Appl. No. 17/063,320.
Notice of Allowance dated Aug. 3, 2021, which issued during the prosecution of U.S. Appl. No. 16/851,410.
Notice of Allowance dated Nov. 5, 2021, which issued during the prosecution of U.S. Appl. No. 16/851,410.
Notice of Allowance dated Nov. 10, 2021, which issued during the prosecution of U.S. Appl. No. 16/851,686.
Supplemental Notice of Allowance dated Nov. 12, 2021, which issued during the prosecution of U.S. Appl. No. 16/851,686.
A European Examination Report issued for European Patent Application No. 17728277.9 on Dec. 23, 2021.
Notice of Allowance dated Jan. 21, 2022, which issued during the prosecution of U.S. Appl. No. 16/098,893.
An Office Action dated Feb. 16, 2022 which issued during the prosecution of U.S. Appl. No. 16/088,321.
An Office Action dated May 6, 2022 which issued during the prosecution of U.S. Appl. No. 16/763,810.
A Non-Final Office Action dated May 26, 2022 which issued during the prosecution of U.S. Appl. No. 17/083,775.
An Office Action dated May 31, 2022 which issued during the prosecution of U.S. Appl. No. 17/083,659.

Examination Report issued by the Indian Patent Office on Jun. 28, 2022 in Indian Patent Application No. 202047019700.
Notice of Allowance issued for U.S. Appl. No. 16/763,810, filed Feb. 8, 2024.
United States Office Action dated Feb. 29, 2024 in U.S. Appl. No. 17/083,647.
Canadian Office Action dated Mar. 4, 2024 in Application No. 3022770.
Canadian Office Action dated Jan. 12, 2023 in Application No. 3022770.
International Search Report and Written Opinion dated Mar. 11, 2024 in Application No. PCT/IB2023/062469.
Canadian Office Action dated Mar. 6, 2024 in Application No. 3160688.
Canadian Office Action dated Mar. 11, 2024 in Application No. 3160692.
United States Office Action dated Mar. 22, 2024 in U.S. Appl. No. 17/360,503.
Canadian Office Action dated Apr. 3, 2024 in Application No. 3160697
Canadian Office Action dated Apr. 19, 2024 in Application No. 3155820.
New Zealand Office Action dated Apr. 23, 2024 in Application No. 787743.
New Zealand Office Action dated Apr. 24, 2024 in Application No. 787745
European Office Action dated Apr. 29, 2024 in Application No. 208003269.
European Office Action dated May 6, 2024 in Application No. 20 800 325.1.
United States Office Action dated May 7, 2024 in U.S. Appl. No. 17/770,339
European Office Action dated May 8, 2024 in Application No. 20828314.3.
Kerem Delikoyun, et al., "2 Deep learning-based cellular image analysis for intelligent medical diagnosis" , De Gruyter, 2021, (4 pages) https://www.degruyter.com/document/doi/10.1515/9783110668322-002/html.
C.Briggs, et al., "ICSH Guidelines for the evaluation of blood cell analysers including those used for differential leucocyte and reticulocyte counting", International Journal of Laboratory Hematology, 2014, vol. 36, pp. 613-627 (15 pages).
An Office Action dated May 16, 2024 which issued during the prosecution of U.S. Appl. No. 17/063,320.
An Office Action dated May 29, 2024 which issued during the prosecution of Korean Application No. 10-2022-7017082.
A Chinese Office Action dated May 9, 2024 which issued during the prosecution of Application No. 202080085933.9.
Notice of Allowance issued for Canadian Application No. 3,155,821 on May 21, 2024.
An Office Action dated May 29, 2024 which issued during the prosecution of Korean Application No. 10-2022-7017081.
Bonnekoh et al., "Profiling lymphocyte subpopulations in peripheral blood under efalizumab treatment of psoriasis by multi epitope ligand cartography (MELC) robot microscopy", European Journal of Dermatology, vol. 16, No. 6, Nov.-Dec. 2006 (3 pages).
Communication issued Feb. 27, 2025 in Chinese Application No. 202080085933.9.
Communication issued Jan. 27, 2025 in Chinese Application No. 202080085480.X.
Communication issued May 23, 2024 in Chinese Application No. 202080073583.4.
Communication issued May 23, 2024 in Chinese Application No. 202080073623.5.
Communication issued Nov. 25, 2024 in Chinese Application No. 202080073583.4.
Communication issued Nov. 25, 2024 in Chinese Application No. 202080073623.5.
Communication issued Sep. 11, 2024 in European Application No. 20828313.5.
Communication issued Jan. 23, 2025 in New Zealand Application No. 787745.

(56) References Cited

OTHER PUBLICATIONS

Communication issued Oct. 23, 2024 in European Application No. 20828312.7.
Communication issued Oct. 23, 2024 in New Zealand Application No. 787745.
Communication issued Oct. 31, 2024 in New Zealand Application No. 787743.
Final Office Action issued Dec. 19, 2024 in U.S. Appl. No. 17/063,320.
Final Office Action issued Dec. 30, 2024 in U.S. Appl. No. 17/083,647.
Haroon et al., "Hide and seek: hematological aspects of malaria—a developing country perspective", J Infect DevCitries, vol. 7, No. 3, 2013, pp. 273-279.
Horton et al., "Quantitative Immunophenotyping of Circulating Tumor Cells in Blood Using Microfluidic Screening Chip Integrated with Hyperspectral Microscope", Transducers, Jun. 21-25, 2009, pp. 77-80.
International Search Report with the Written Opinion of the International Searching Authority issued Sep. 2, 2024 in Application No. PCT/IB2024/054798.
Communication issued Jul. 10, 2024 in International Application No. PCT/IB2024/054798.
Communication issued Jan. 14, 2025 in Japanese Application No. 2024-015207.
Communication issued Jul. 1, 2024 in Japanese Application No. 2022-521112.
Communication issued Jul. 3, 2024 in Japanese Application No. 2022-521238.
Communication issued Nov. 5, 2024 in Japanese Application No. 2022-534369.
Communication issued Nov. 11, 2024 in Japanese Application No. 2022-521238.
Communication issued Nov. 7, 2024 in Japanese Application No. 2022-521112.
Niehues et al., "A classification based on T cell selection-related phenotypes identifies a subgroup of childhood T-ALL with favorable outcome in the Co All studies", Leukemia, vol. 13, 1999, pp. 614-617.
Non-Final Office Action issued Jul. 8, 2024 in U.S. Appl. No. 18/397,324.
Non-Final Office Action issued Sep. 28, 2024 in U.S. Appl. No. 17/770,339.
Notice of Allowance issued Aug. 7, 2024 in U.S. Appl. No. 17/783,924.
Notice of Allowance issued Mar. 8, 2024 in U.S. Appl. No. 17/082,615.
Notice of Allowance issued Sep. 23, 2024 in U.S. Appl. No. 18/203,109.
Notice of Allowance issued Jun. 13, 2024 in U.S. Appl. No. 18/203,109.
Novelli et al., "Clinical predictors of severe malarial anaemia in a holoendemic Plasmodium falciparum transmission area", British Journal of Haematology, vol. 149, Apr. 16, 2010, pp. 711-721 (12 pages total).
Non-Final Office Action issued Aug. 15, 2024 in U.S. Appl. No. 17/083,647.
Non-Final Office Action issued Jan. 13, 2025 in U.S. Appl. No. 17/770,365.
Non-Final Office Action issued Jan. 15, 2025 in U.S. Appl. No. 17/836,561.
Non-Final Office Action issued Mar. 13, 2025 in U.S. Appl. No. 17/783,831.
Communication issued Mar. 5, 2025 in Japanese Application No. 2022-534230.
Communication issued Oct. 3, 2024 in Japanese Application No. 2022-534230.
Communication issued Oct. 7, 2024 in Japanese Application No. 2022-534229.
Communication issued Sep. 3, 2024 in Canadian Application No. 3,081,669.
Thuma et al., "Distinct Clinical and Immunologic Profiles in Severe Malarial Anemia and Cerebral Malaria in Zambia", The Journal of Infectious Diseases, vol. 203, Jan. 2011, pp. 211-219 (10 pages total).
Final Office Action issued Apr. 28, 2025 in U.S. Appl. No. 17/770,365.
Non-Final Office Action issued May 20, 2025 in U.S. Appl. No. 17/083,647.
Communication issued Apr. 30, 2025 in Chinese Application No. 202210483679.9.
Communication issued May 8, 2025 in Chinese Application No. 202111613655.2.
Notice of Allowance issued Apr. 21, 2025 in U.S. Appl. No. 17/063,320.
Final Office Action issued Jul. 1, 2025 in U.S. Appl. No. 17/783,831.
Communication issued Jun. 16, 2025 in Canadian Application No. 3,160,692.
Office Action issued Jun. 17, 2025 in U.S. Appl. No. 17/783,839.
Communication issued Jun. 13, 2025 in European Application No. 22209948.3.
Communication issued Jul. 15, 2025 in Australian Application No. 2020370212.
Communication issued Jul. 15, 2025 in Australian Application No. 2020400353.
Communication issued Jul. 28, 2025 in Australian Application No. 2020402284.

\* cited by examiner

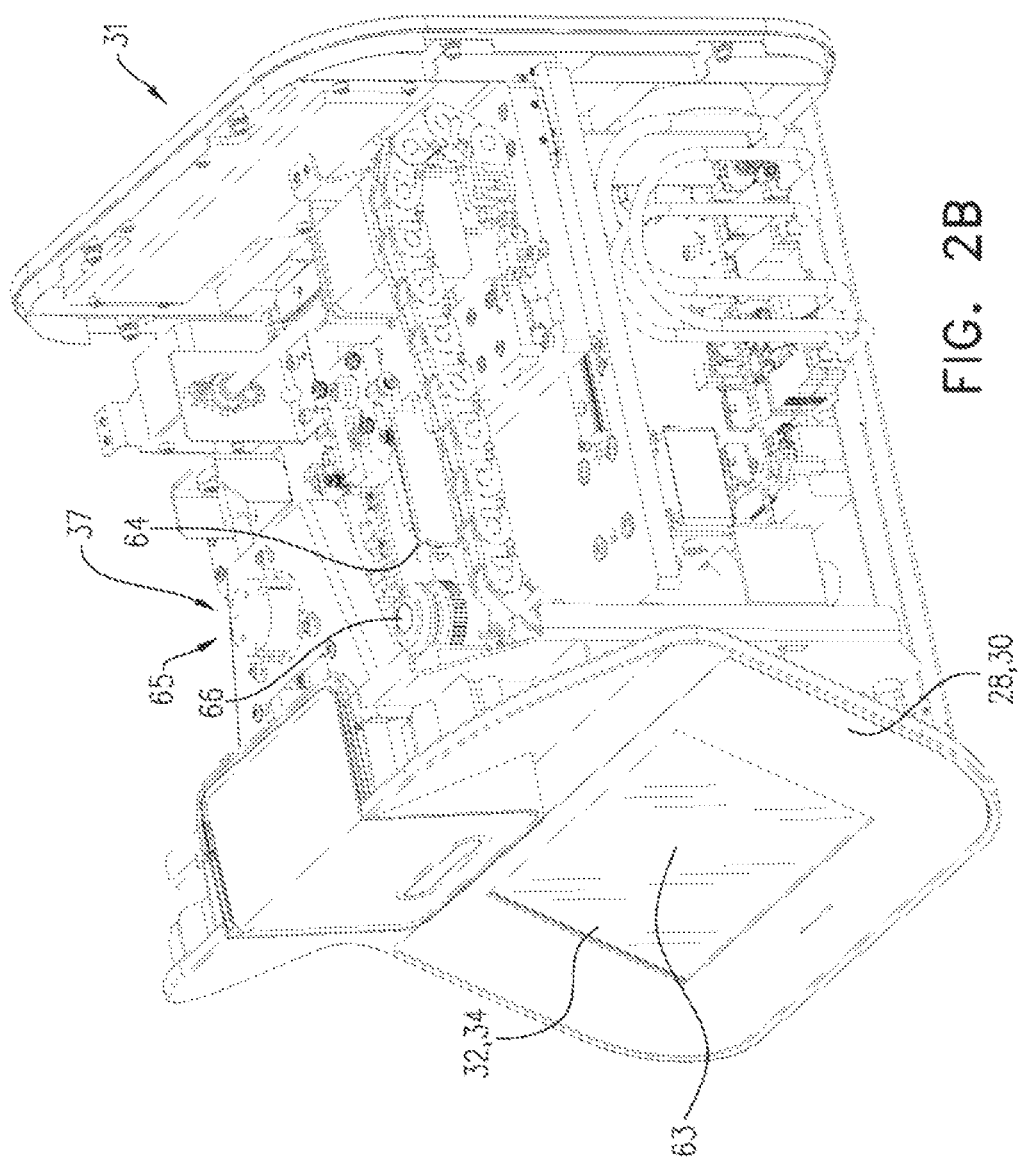

DETECTING PLATELETS IN A BLOOD SAMPLE

CROSS-REFERENCE TO RELATED APPLICATIONS

The present application is a US national phase application of PCT Application No. PCT/IB2020/061724 to Yafin (published as WO 21/116955), filed Dec. 10, 2020, which claims priority from U.S. Provisional Patent Application No. 62/946,998 to Yafin et al., filed Dec. 12, 2019, entitled "Detecting Platelets in a Blood Sample," which is incorporated herein by reference.

FIELD OF EMBODIMENTS OF THE INVENTION

Some applications of the presently disclosed subject matter relate generally to analysis of bodily samples, and in particular, to optical density and microscopic measurements that are performed upon blood samples.

BACKGROUND

In some optics-based methods (e.g., diagnostic, and/or analytic methods), a property of a biological sample, such as a blood sample, is determined by performing an optical measurement. For example, the density of a component (e.g., a count of the component per unit volume) may be determined by counting the component within a microscopic image. Similarly, the concentration and/or density of a component may be measured by performing optical absorption, transmittance, fluorescence, and/or luminescence measurements upon the sample. Typically, the sample is placed into a sample carrier and the measurements are performed with respect to a portion of the sample that is contained within a sample chamber of the sample carrier. The measurements that are performed upon the portion of the sample that is contained within the sample chamber of the sample carrier are analyzed in order to determine a property of die sample.

SUMMARY OF EMBODIMENTS

In accordance with some applications of the present invention, a portion of a blood sample that comprises a cell suspension is placed within a sample chamber that is a cavity that includes a base surface. Typically, the cells in the cell suspension are allowed to settle on the base surface of tire sample chamber to form a monolayer of cells on the base surface of the sample chamber. Subsequent to the cells having been left to settle on the base surface of the sample chamber (e.g., by having been left to settle for a predefined time interval), at least one microscopic image of at least a portion of the monolayer of cells is typically acquired. Typically, a plurality of images of the monolayer are acquired, each of the images corresponding to an imaging field that is located at a respective, different area within the imaging plane of the monolayer. Typically, an optimum depth level at which to focus the microscope in order to image the monolayer is determined, e.g., using techniques as described in U.S. Pat. No. 10,176,565 to Greenfield, which is incorporated herein by reference. For some applications, respective imaging fields have different optimum depth levels from each other. For some applications, platelets that have settled within the monolayer are identified within the at least one microscopic image of at least a portion of the monolayer of cells.

The inventors of the present application have noticed that it is often the case that, even after having been left to settle such as to form a monolayer using the techniques described herein, not all of the platelets within a blood sample settle within the monolayer, and some cells continue to be suspended within the cell solution. More specifically, the inventors have found that it is typically the case that, even after the sample has been left to settle for approximately two minutes, between 10 percent and 70 percent of the platelets within the sample do not settle within the monolayer focus field. Typically, if the monolayer is allowed to form over a longer time period, then more platelets settle within the monolayer focus field. However, the inventors have found that even if the monolayer is allowed to form over a relatively long time period (e.g., between 15 and 30 minutes), some platelets still remain suspended within the solution such that the platelets are not disposed within the monolayer focus field. Typically, the number of platelets that remain suspended within the solution (such that the platelets are not disposed within the monolayer focus field) is dependent on the time for which the monolayer is allowed to form, in addition to the height of the cavity in which the cell solution is placed.

Therefore, for some applications, in order to accurately estimate the number of platelets in the sample, platelets that are suspended within the cell solution are identified, in addition to identifying platelets within the monolayer focus field. Typically, such platelets are identified by focusing the microscope at additional depth levels to tire depth level(s) to which the microscope is focused in order to image the monolayer of cells (referred to herein as "the monolayer depth level(s)"), and acquiring images at the additional depth levels. Typically, the platelets within the images that are acquired at the additional depth levels are identified and counted, and, based upon the count of platelets within those images, a total count of the platelets that are suspended within the cell solution is estimated.

For some applications, a count of the platelets that have settled within the monolayer is compared to a count of the platelets that have not settled within the monolayer. Typically, an output is generated in response to the comparison. For some applications, a clinical condition is derived and outputted to a user, based upon the comparison of the count of the platelets that have settled within the monolayer and the count of the platelets that have not settled within the monolayer. For example, the extent of platelet activation within the sample may be derived, at least partially based upon the comparison. Alternatively or additionally, a clinical condition may be derived based upon the size, shape, settling time, and/or settling dynamics of the platelets. For some such applications, the settling dynamics of the platelets are determined by imaging the same imaging field a plurality of times, with a lime interval between each of the image acquisitions, and/or by determining until what height within the sample chamber platelets are present at a given time.

For some applications, a computer processor generates an output indicating that the sample should be prepared in a different way to how it was prepared (e.g., by modifying the diluent within which the sample is diluted, by adding a platelet activation agent, and/or by adding a coagulation agent), based upon the comparison.

For some applications, based upon the comparison between the count of the platelets that have settled within the monolayer and the count of the platelets that have not settled within the monolayer, the portion of the blood sample is invalidated from being used for performing at least some measurements upon the sample. For example, if the ratio of unsettled platelets to settled platelets is greater than a first given threshold, and/or lower than a second given threshold, then this might be interpreted as being indicative of a problem with the sample and/or the preparation thereof.

For some applications, a parameter of the sample (such as platelet volume, mean platelet volume, and/or median platelet volume) is determined based upon a measurement that is performed upon the portion of the sample. For some applications, the measurement is calibrated, based upon the comparison between properties of the platelets that have settled within the monolayer and properties of the platelets that have not settled within the monolayer.

There is therefore provided, in accordance with some applications of the present invention, a method including:

placing at least a portion of a blood sample that is a cell suspension within a sample chamber that is a cavity that includes a base surface:
  allowing the cells in the cell suspension to settle on the base surface of the sample chamber to form a monolayer of cells on the base surface of the sample chamber;
  acquiring at least one first microscopic image of at least a portion of the monolayer of cells, using a microscope while the microscope is focused at a monolayer-depth-level, at which the monolayer is within focus of the microscope;
  identifying platelets that have settled within the monolayer, within the at least one microscopic image;
  based upon the platelets that are identified within the at least one microscopic image, determining a first platelet count of platelets that have settled within the monolayer;
  acquiring at least one additional microscopic image of the portion of tire sample using the microscope, while the microscope is focused at a different depth level from the monolayer-depth-level;
  identifying platelets that have not settled within the monolayer, within the at least one additional microscopic image;
  based upon the platelets that are identified within the at least one additional microscopic image, determining a second platelet count of platelets that have not settled within the monolayer; and
  generating an output based upon the first and second platelet counts.

In some applications, the method further includes deriving an error with the blood sample at least partially based upon comparing the first and second platelet counts to each other, wherein generating the output includes generating an indication of the error.

In some applications, the method further includes deriving an error with preparation of the blood sample at least partially based upon comparing the first and second platelet counts to each other, wherein generating the output includes generating an indication of the error.

In some applications, the method further includes deriving a clinical condition of the subject at least partially based upon comparing the first and second platelet counts to each other, wherein generating the output includes generating an indication of the clinical condition.

In some applications, the method further includes deriving a measure of platelet activation at least partially based upon comparing the first and second platelet counts to each other, wherein generating the output includes generating an indication of the platelet activation.

In some applications, identifying platelets that have not settled within the monolayer within the at least one additional microscopic image includes accounting for interference with visibility of platelets by white blood cells that are disposed within the monolayer.

In some applications, identifying platelets that have not settled within the monolayer within the at least one additional microscopic image includes accounting for interference with visibility of platelets by red blood cells that are disposed within the monolayer.

In some applications:
  acquiring the at least one first microscopic image of the portion of the monolayer of cells includes acquiring a first number of images of the monolayer at respective imaging fields while the microscope is focused at one or more monolayer-depth-levels, at which the monolayer is within focus of the microscope;
  acquiring the at least one additional microscopic image of the portion of the sample includes acquiring a second number of images at respective imaging fields, while the microscope is focused at the different depth level from the monolayer-depth-level; and
  a ratio between the first number and the second number is greater than 2:1.

In some applications:
  acquiring the at least one additional microscopic image of the portion of the sample includes acquiring a plurality of additional microscopic images, while the microscope is focused at respective different depth levels from the monolayer-depth level; and
  identifying platelets that have not settled within the monolayer within the at least one additional microscopic image includes avoiding duplicate counts of platelets within images that are acquired at adjacent depth levels.

In some applications, avoiding duplicate counts of platelets within images that are acquired at adjacent depth levels includes accounting for lateral movement of platelets between acquisitions of the images that are acquired at adjacent depth levels.

There is further provided, in accordance with some applications of the present invention, a method including:

placing at least a portion of a blood sample that is a cell suspension within a sample chamber that is a cavity that includes a base surface;
  allowing the cells in the cell suspension to settle on die base surface of the sample chamber to form a monolayer of cells on the base surface of the sample chamber;
  acquiring at least one microscopic image of at least a portion of the monolayer of cells, using a microscope while the microscope is focused at a monolayer-depth-level, at which the monolayer is within focus of the microscope;
  identifying platelets that have settled within the monolayer, within the at least one microscopic image;
  acquiring at least one additional microscopic image of the portion of the sample using the microscope, while the microscope is focused at a different depth level from the monolayer-depth-level;
  identifying platelets that have not settled within the monolayer, within the at least one additional microscopic image; and generating an output at least partially based upon the platelets identified as having settled within the monolayer and the platelets identified as not having settled within the monolayer.

In some applications, the method further includes estimating a platelet count for the blood sample based upon the platelets identified as having settled within the monolayer and the platelets identified as not having settled within the monolayer, wherein generating the output includes generating an indication of the platelet count.

In some applications, the method further includes deriving a platelet-settling characteristic of the sample based upon the platelets identified as having settled within the monolayer and the platelets identified as not having settled within the monolayer, wherein generating the output includes generating an indication of the platelet-settling characteristic.

In some applications, the method further includes deriving a characteristic of platelets within the sample based upon a combination of the platelets identified as having settled within the monolayer and the platelets identified as not having settled within the monolayer, wherein generating the output includes generating an indication of the derived characteristic.

There is further provided, in accordance with some applications of the present invention, a method including:
 placing at least a portion of a sample that is a suspension within a sample chamber that is a cavity that includes a base surface;
 allowing entities in the cell suspension to settle on the base surface of the sample chamber to form a monolayer of entities on the base surface of the sample chamber;
 acquiring at least one microscopic image of at least a portion of the monolayer of entities, using a microscope while the microscope is focused at a monolayer-depth-level, at which the monolayer is within focus of the microscope;
 identifying entities of a given type that have settled within the monolayer, within the at least one microscopic image;
 acquiring at least one additional microscopic image of the portion of the sample using the microscope, while the microscope is focused at a different depth level from the monolayer-depth level;
 identifying entities of the given type that have not settled within the monolayer, within the at least one additional microscopic image; and
 generating an output at least partially based upon the entities of the given type identified as having settled within the monolayer and the entities of the given type identified as not having settled within the monolayer.

There is further provided, in accordance with some applications of the present invention, apparatus including:
 a sample chamber that is a cavity that includes a base surface and that is configured to receive at least a portion of a blood sample that is a cell suspension and to allow the cells in the cell suspension to settle on the base surface of the sample chamber to form a monolayer of cells on the base surface of the sample chamber;
 a microscope configured to acquire:
  at least one first microscopic image of at least a portion of the monolayer of cells, while the microscope is focused at a monolayer-depth-level, at which the monolayer is within locus of the microscope, and
  at least one additional microscopic image of the portion of the sample, while the microscope is focused at a different depth level from the monolayer-depth-level; and
 a computer processor configured to:
  identify platelets that have settled within the monolayer, within the at least one first microscopic image,
  determine a first platelet count of platelets that have settled within the monolayer, based upon the platelets that are identified within the at least one microscopic image,
  identify platelets that have not settled within the monolayer, within the at least one additional microscopic image,
  determine a second platelet count of platelets that have not settled within the monolayer, based upon the platelets that are identified within the at least one additional microscopic image; and
  generate an output based upon the first and second platelet counts.

There is further provided, in accordance with some applications of the present invention, apparatus including:
 a sample chamber that is a cavity that includes a base surface and that is configured to receive at least a portion of a blood sample that is a cell suspension and to allow the cells in the cell suspension to settle on the base surface of the sample chamber to form a monolayer of cells on the base surface of the sample chamber;
 a microscope configured to acquire:
  at least one first microscopic image of at least a portion of the monolayer of cells, while the microscope is focused at a monolayer-depth-level, at which the monolayer is within focus of the microscope, and
  at least one additional microscopic image of the portion of the sample, while the microscope is focused at a different depth level from the monolayer-depth-level; and
 a computer processor configured to:
  identify platelets that have settled within the monolayer, within the at least one first microscopic image,
  identify platelets that have not settled within the monolayer, within the at least one additional microscopic image, and
  generate an output at least partially based upon the platelets identified as having settled within the monolayer and the platelets Identified as not having settled within the monolayer.

There is further provided, in accordance with some applications of the present invention, apparatus including:
 a sample chamber that is a cavity that includes a base surface and that is configured to receive at least a portion of a sample that is a cell suspension and to allow the cells in the cell suspension to settle on the base surface of the sample chamber to form a monolayer of cells on the base surface of the sample chamber;
 a microscope configured to acquire:
  at least one first microscopic image of at least a portion of the monolayer of cells, white the microscope is focused at a monolayer-depth-level, at which the monolayer is within focus of the microscope, and
  at least one additional microscopic image of the portion of the sample, while the microscope is focused at a different depth level from the monolayer-depth-level; and a computer processor configured to:
  identify entities of a given type that have settled within the monolayer, within the at least one first microscopic image,
  identify entities of the given type that have not settled within the monolayer, within the at least one additional microscopic image, and
  generate an output at least partially based upon the entities of the given type identified as having settled within the monolayer and the entities of the given type identified us not having settled within the monolayer.

The present invention will be more fully understood from the following detailed description of embodiments thereof, taken together with the drawings, in which:

BRIEF DESCRIPTION OF THE DRAWINGS

FIGS. 2A, 2B, and 2C are schematic illustrations of an optical measurement unit, in accordance with some applications of the present invention;

DETAILED DESCRIPTION OF EMBODIMENTS

Figure 1:
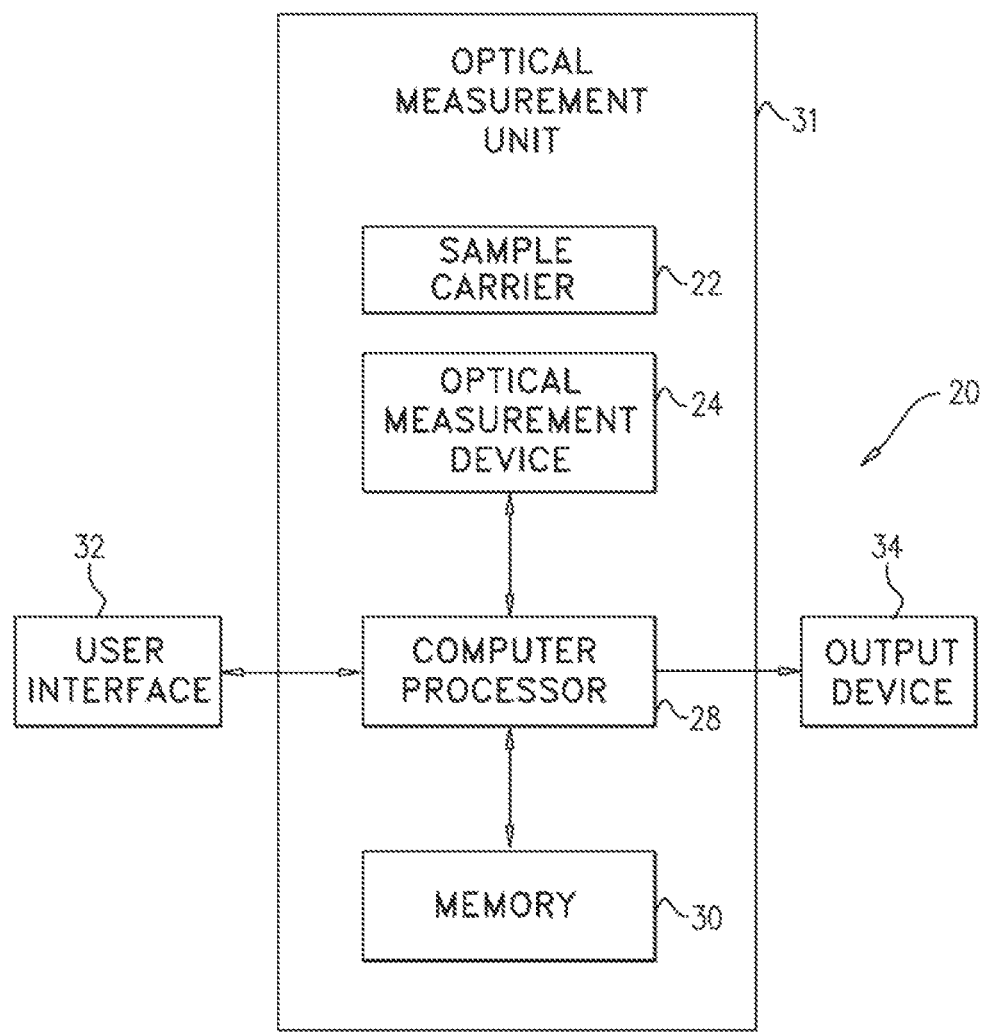
FIG. 1 is a block diagram showing components of a biological sample analysis system, in accordance some applications of the present invention.

Reference is now made to FIG. 1, which is block diagram showing components of a biological sample analysis system 20, in accordance with some applications of the present invention. Typically, a biological sample (e.g., a blood sample) is placed into a sample carrier 22. While die sample is disposed in the sample carrier, optical measurements are performed upon the sample using one or more optical measurement devices 24. For example, the optical measurement devices may include a microscope (e.g., a digital microscope), a spectrophotometer, a photometer, a spectrometer, a camera, a spectral camera, a hyperspectral camera, a fluorometer, a spectrofluorometer, and/or a photodetector (such as a photodiode, a photoresistor, and/or a phototransistor). For some applications, the optical measurement devices include dedicated light sources (such as light emitting diodes, incandescent light sources, etc.) and/or optical elements for manipulating light collection and/or light emission (such as lenses, diffusers, filters, etc.).

A computer processor 28 typically receives and processes optical measurements that are performed by the optical measurement device. Further typically, the computer processor controls the acquisition of optical measurements that are performed by the one or more optical measurement devices. The computer processor communicates with a memory 30. A user (e.g., a laboratory technician, or an individual from whom the sample was drawn) sends instructions to the computer processor via a user interface 32. For some applications, the user interface includes a keyboard, a mouse, a joystick, a touchscreen device (such as a smartphone or a tablet computer), a touchpad, a trackball, a voice-command interface, and/or other types of user interfaces that are known in the art. Typically, the computer processor generates an output via an output device 34. Further typically, the output device includes a display, such as a monitor, and the output includes an output that is displayed on the display. For some applications, the processor generates an output on a different type of visual, text, graphics, tactile, audio, and/or video output device, e.g., speakers, headphones, a smartphone, or a tablet computer. For some applications, user interface 32 acts as both an input interface and an output interface, i.e., it acts as an input/output interface. For some applications, the processor generates an output on a computer-readable medium (e.g., a non-transitory computer-readable medium), such as a disk, or a portable USB drive, and/or generates an output on a printer.

Figure 2A:
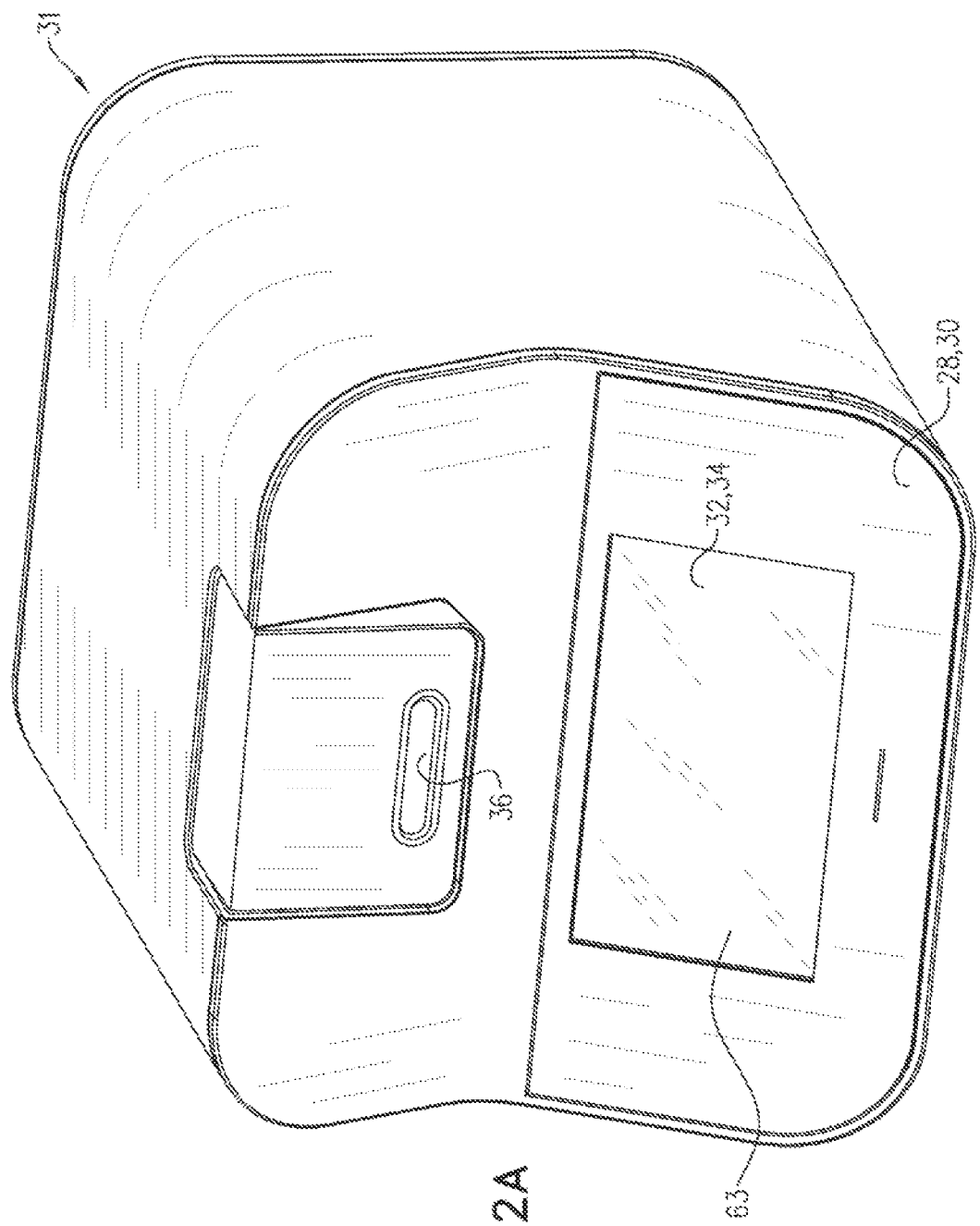
Figure 2C:
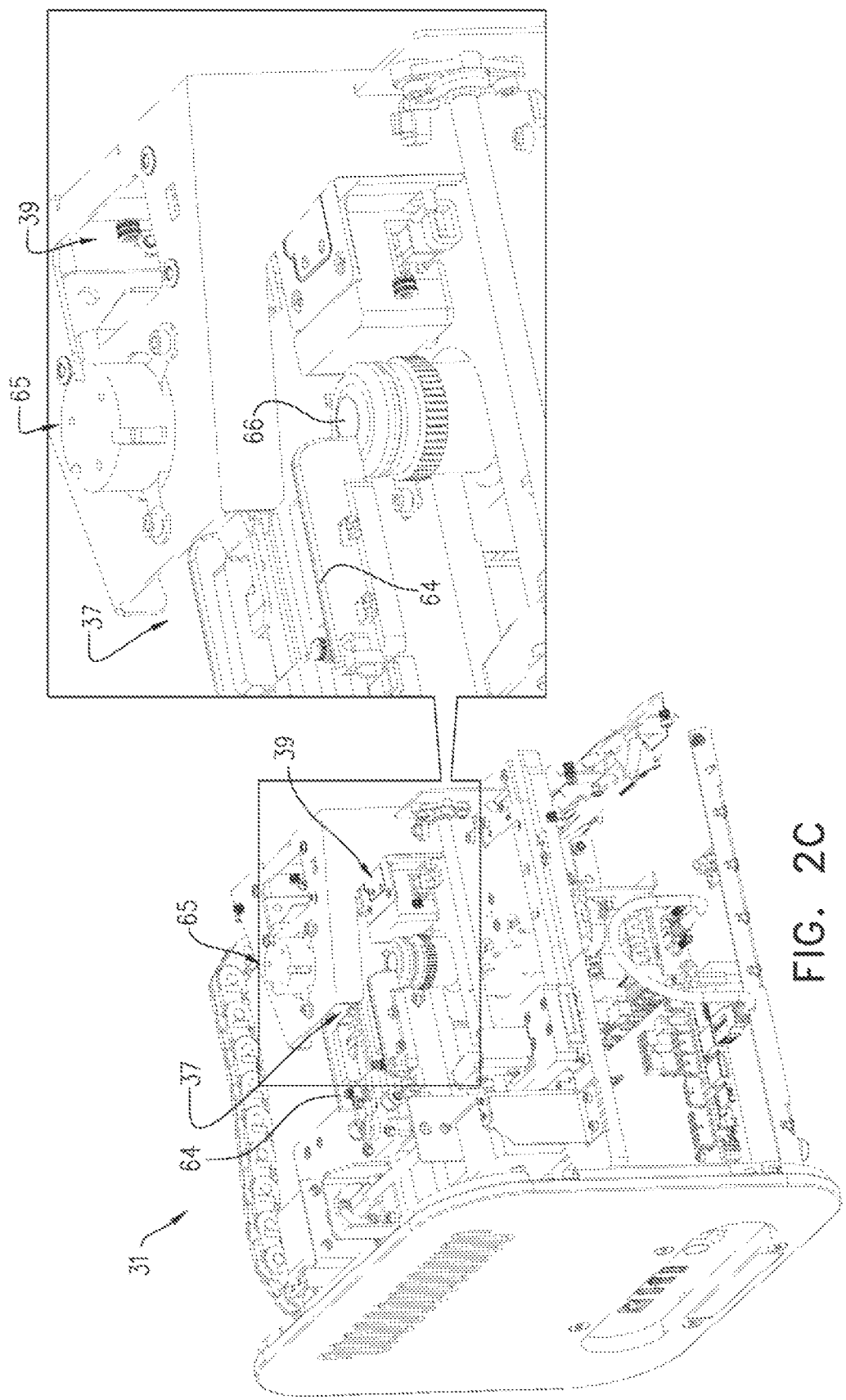

Reference is now made to FIGS. 2A, 2B, and 2C, which are schematic illustrations of an optical measurement unit 31, in accordance with some applications of tire present invention. FIG. 2A shows an oblique view of the exterior of the fully assembled device, while FIGS. 2B and 2C shows respective oblique views of the device with the cover having been made transparent, such components within the device are visible. For some applications, one or more optical measurement devices 24 (and/or computer processor 28 and memory 30) is housed inside optical measurement unit 31. In order to perform the optical measurements upon the sample, sample carrier 22 is placed inside the optical measurement unit. For example, the optical measurement unit may define a slot 36, via which the sample earner is inserted into the optical measurement unit. Typically, the optical measurement unit includes a stage 64, which is configured to support sample carrier 22 within the optical measurement unit. For some applications, a screen 63 on the cover of the optical measurement unit (e.g., a screen on the front cover of the optical measurement unit, as shown) functions as user interface 32 and/or output device 34.

Typically, the optical measurement unit includes microscope system 37 (shown in FIGS. 2B-C) configured to perform microscopic imaging of a portion of the sample. For some applications, the microscope system includes a set of light sources 65 (which typically include a set of brightfield light sources (e.g. light emitting diodes) that are configured to be used for brightfield imaging of the sample, a set of fluorescent light sources (e.g. light emitting diodes) that are configured to be used for fluorescent imaging of the sample), and a camera (e.g., a CCD camera, or a CMOS camera) configured to image the sample. Typically, the optical measurement unit also includes an optical-density-measurement unit 39 (shown in FIG. 2C) configured to perform optical density measurements (e.g., optical absorption measurements) on a second portion of the sample. For some applications, the optical-density-measurement unit includes a set of optical-density-measurement light sources (e.g., light emitting diodes) and light detectors, which are configured for performing optical density measurements on the sample. For some applications, each of the aforementioned sets of light sources (i.e., the set of brightfield light sources, the set of fluorescent light sources, and the set optical-density-measurement light sources) includes a plurality of light sources (e.g. a plurality of light emitting diodes), each of which is configured to emit light at a respective wavelength or at a respective band of wavelengths.

Figure 3A:
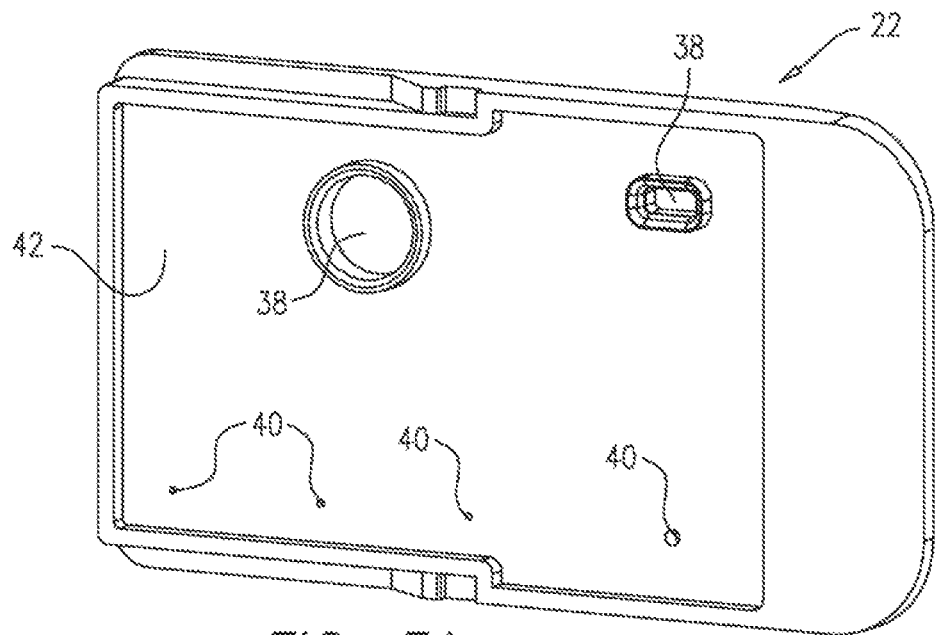
FIGS. 3A, 3B, and 3C are schematic illustrations of respective views of a sample carrier that is used for performing both microscopic measurements and optical density measurements, in accordance with some applications of the present invention.
Figure 3B:
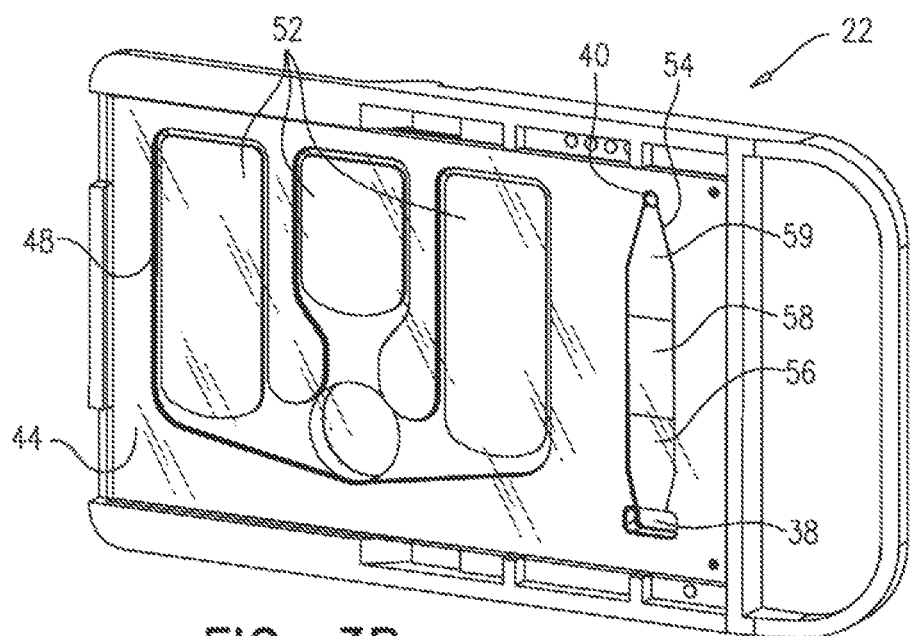

Reference is now made to FIGS. 3A and 3B, which are schematic illustrations of respective views of sample carrier 22, in accordance with some applications of the present invention. FIG. 3A shows a top view of the sample carrier (the top cover of the sample carrier being shown as being opaque in FIG. 3A, for illustrative purposes), and FIG. 3B shows a bottom view (in which the sample carrier has been rotated around its short edge with respect to the view shown in FIG. 3A). Typically, the sample carrier includes a first set 52 of one or more sample chambers, which are used for performing microscopic analysis upon the sample, and a second set 54 of sample chambers, which are used for performing optical density measurements upon the sample. Typically, the sample chambers of the sample carrier are filled with a bodily sample, such as blood via sample inlet holes 38. For some applications, the sample chambers define one or more outlet holes 40. The outlet holes are configured to facilitate filling of the sample chambers with the bodily sample, by allowing air that is present in the sample chambers to be released from the sample chambers. Typically, as shown, the outlet holes are located longitudinally opposite the inlet holes (with respect to a sample chamber of the sample carrier). For some applications, the outlet holes thus provide a more efficient mechanism of air escape than if the outlet holes were to be disposed closer to the inlet holes.

Figure 3C:
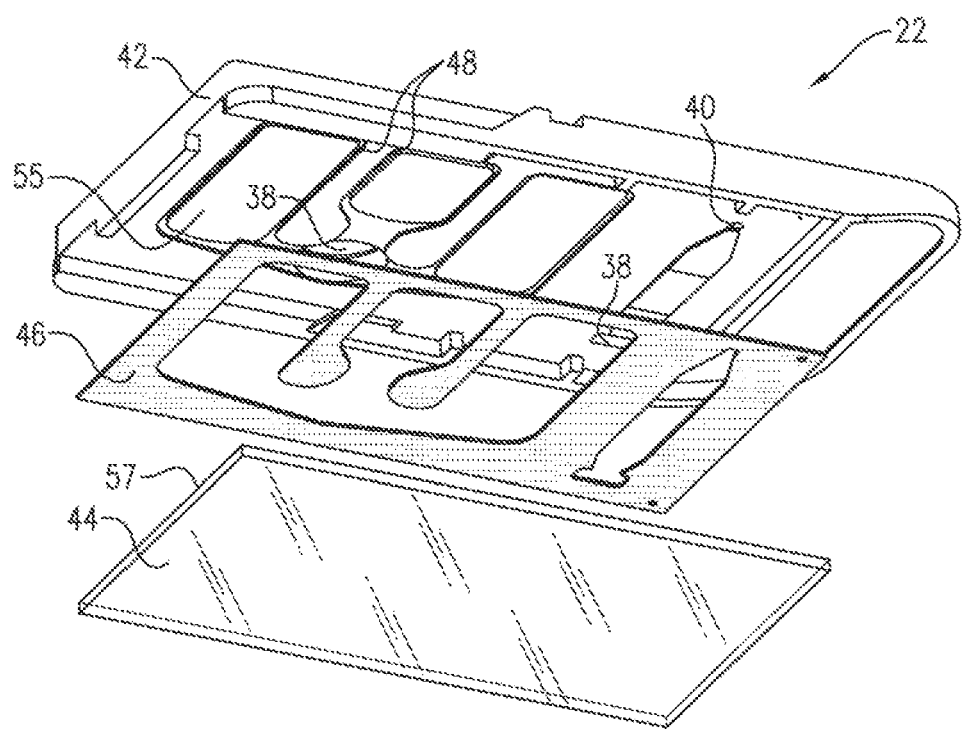

Reference is made to FIG. 3C, which shows an exploded view of sample carrier 22, in accordance with some applications of the present invention. For some applications, the sample carrier includes at least three components; a molded component 42, a glass layer 44 (e.g., a glass sheet), and an adhesive layer 46 configured to adhere the glass layer to an underside of the molded component. The molded component is typically made of a polymer (e.g., a plastic) that is molded (e.g., via injection molding) to provide the sample chambers with a desired geometrical shape. For example, as shown, the molded component is typically molded to define inlet holes 38, outlet holes 40, and gutters 48 which surround the central portion of each of the sample chambers. The gutters typically facilitate filling of the sample chambers with the bodily sample, by allowing, air to flow to the outlet holes, and/or by allowing the bodily sample to flow around the central portion of the sample chamber.

For some applications, a sample carrier as shown in FIGS. 3A-C is used when performing a complete blood count on a blood sample. For some such applications, the sample carrier is used with optical measurement unit 31 configured as generally shown and described with reference to FIGS. 2A-C. For some applications, a first portion of the blood sample is placed inside first set 52 of sample chambers (which are used for performing microscopic analysis upon the sample, e.g., using microscope system 37 (shown in FIGS. 2B-C)), and a second portion of the blood sample is placed inside second set 54 of sample chambers (which are used for performing optical density measurements upon the sample, e.g., using optical-density-measurement unit 39 (shown in FIG. 2C)). For some applications, first set 52 of sample chambers includes a plurality of sample chambers, while second set 54 of sample chambers includes only a single sample chamber, as shown. However, the scope of the present application, includes using any number of sample chambers (e.g., a single sample chamber or a plurality of sample chambers) within either the first set of sample chambers or within the second set of sample chambers, or any combination thereof. The first portion of the blood sample is typically diluted with respect to the second portion of the blood sample. For example, the diluent may contain pH buffers, stains, fluorescent stains, antibodies, sphering agents, lysing agents, etc. Typically, the second portion of the blood sample, which is placed inside second set 54 of sample chambers is a natural, undiluted blood sample. Alternatively or additionally, the second portion of the blood sample may be a sample that underwent some modification, including, for example, one or more of dilution (e.g., dilution in a controlled fashion), addition of a component or reagent, or fractionation.

For some applications, one or more staining substances are used to stain the first portion of the blood sample (which is placed inside first set 52 of sample chambers) before the sample is imaged microscopically. For example, the staining substance may be configured to stain DNA with preference over staining of other cellular components. Alternatively, the staining substance may be configured to stain all cellular nucleic acids with preference over staining of other cellular components. For example, the sample may be stained with acridine orange reagent. Hoechst reagent, and/or any other staining substance that is configured to preferentially stain DNA and/or RNA within the blood sample. Optionally, the staining substance is configured to stain all cellular nucleic acids but the staining of DNA and RNA are each more prominently visible under some lighting and filter conditions, as is known, for example, for acridine orange. Images of the sample may be acquired using imaging conditions that allow detection of cells (e.g., brightfield) and/or imaging conditions that allow visualization of stained bodies (e.g. appropriate fluorescent illumination). Typically, the first portion of the sample is stained with acridine orange and with a Hoechst reagent. For example, the first (diluted) portion of the blood sample may be prepared using techniques as described in U.S. Pat. No. 9,329,129 to Pollak, which is incorporated herein by reference, and which describes a method for preparation of blood samples for analysis that involves a dilution step, the dilution step facilitating the identification and/or counting of components within microscopic images of the sample. For some applications, the first portion of the sample is stained with one or more stains that cause platelets within the sample to be visible under brightfield imaging conditions and/or under fluorescent imaging conditions, e.g., as described hereinabove. For example, the first portion of the sample may be stained with methylene blue and/or Romanowsky stains.

Referring again to FIGS. 2B-C, typically, sample carrier 22 is supported within the optical measurement unit by stage 64. Further typically, the stage has a forked design, such that the sample carrier is supported by the stage around the edges of the sample carrier, but such that the stage does not interfere with the visibility of the sample chambers of the sample carrier by the optical measurement devices. For some applications, the sample carrier is held within the stage, such that molded component 42 of the sample carrier is disposed above the glass layer 44, and such that an objective lens 66 of a microscope unit of the optical measurement unit is disposed below the glass layer of the sample carrier. Typically, at least some light sources 65 that are used during microscopic measurements that are performed upon the sample (for example, light sources that are used during brightfield imaging) illuminate the sample carrier from above the molded component. Further typically, at least some additional light sources (not shown) illuminate the sample carrier from below the sample carrier (e.g., via the objective lens). For example, light sources that are used to excite the sample during fluorescent microscopy may illuminate the sample carrier from below the sample carrier (e.g., via the objective lens).

Typically, prior to being imaged microscopically, the first portion of blood (which is placed in first set 52 of sample chambers) is allowed to settle such as to form a monolayer of cells, e.g., using techniques as described in U.S. Pat. No. 9,329,129 to Pollack, which is incorporated herein by reference. It is noted that, in the context of the present application, the term monolayer is used to mean a layer of cells that have settled, such as to be disposed within a single focus field of the microscope. Within the monolayer there may be some overlap of cells, such that within certain areas there are two or more overlapping layers of cells. For example, red blood cells may overlap with each other within the monolayer, and/or platelets may overlap with, or be disposed above, red blood cells within the monolayer.

For some applications, die microscopic analysis of the first portion of the blood sample is performed with respect to the monolayer of cells. Typically, the first portion of the blood sample is imaged under brightfield imaging, i.e., under illumination from one or more light sources (e.g., one or more light emitting diodes, which typically emit light at respective spectral bands). Further typically, the first portion of the blood sample is additionally imaged under fluorescent imaging. Typically, the fluorescent imaging is performed by exciting stained objects (i.e., objects that have absorbed the stain(s)) within the sample by directing light toward the sample at known excitation wavelengths (i.e., wavelengths at which it is known that stained objects emit fluorescent light if excited with light at those wavelengths), and detecting the fluorescent light. Typically, for the fluorescent imaging, a separate set of light sources (e.g., one or more light emitting diodes) is used to illuminate the sample at the known excitation wavelengths.

As described with reference to US 2019/0302099 to Pollak, which is incorporated herein by reference, for some applications, sample chambers belonging to set 52 (which is used for microscopy measurements) have different heights from each other, in order to facilitate different measurands being measured using microscope images of respective sample chambers, and/or different sample chambers being used for microscopic analysis of respective sample types. For example, if a blood sample, and/or a monolayer formed by the sample, has a relatively low density of red blood cells, then measurements may be performed within a sample chamber of the sample carrier having a greater height (i.e., a sample chamber of the sample carrier having a greater height relative to a different sample chamber having a relatively lower height), such that there is a sufficient density of cells, and/or such that there is a sufficient density of cells within the monolayer formed by the sample, to provide statistically reliable data. Such measurements may include, for example red blood cell density measurements, measurements of other cellular attributes, (such as counts of abnormal red blood cells, red blood cells that include intracellular bodies (e.g., pathogens, Howell-Jolly bodies), etc.), and/or hemoglobin concentration. Conversely, if a blood sample, and/or a monolayer formed by the sample, has a relatively high density of red blood cells, then such measurements may be performed upon a sample chamber of the sample carrier having a relatively low height, for example, such that there is a sufficient sparsity of cells, and/or such that there is a sufficient sparsity of cells within the monolayer of cells formed by the sample, that the cells can be identified within microscopic images. For some applications, such methods are performed even without the variation in height between the sample chambers belonging to set 52 being precisely known.

For some applications, based upon the measurand that is being measured, the sample chamber within the sample carrier upon which to perform optical measurements is selected. For example, a sample chamber of the sample carrier having a greater height may be used to perform a white blood cell count (e.g., to reduce statistical errors which may result from a low count in a shallower region), white blood cell differentiation, and/or to detect more rare forms of white blood cells. Conversely, in order to determine mean corpuscular hemoglobin (MCH), mean corpuscular volume (MCV), red blood cell distribution width (RDW), red blood cell morphologic features, and/or red blood cell abnormalities, microscopic images may be obtained from a sample chamber of the sample carrier having a relatively low height, since in such sample chambers the cells are relatively sparsely distributed across the area of the region, and/or form a monolayer in which the cells are relatively sparsely distributed. Similarly, in order to count platelets, classify platelets, and/or extract any other attributes (such as volume) of platelets, microscopic images may be obtained from a sample chamber of the sample carrier having a relatively low height, since within such sample chambers there are fewer red blood cells which overlap (fully or partially) with the platelets in microscopic images, and/or in a monolayer.

In accordance with the above-described examples, it is preferable to use a sample chamber of the sample carrier having a lower height for performing optical measurements for measuring some measurands within a sample (such as a blood sample), whereas it is preferable to use a sample chamber of the sample carrier having a greater height for performing optical measurements for measuring other measurands within such a sample. Therefore, for some applications, a first measurand within a sample is measured, by performing a first optical measurement upon (e.g., by acquiring microscopic images of) a portion of the sample that is disposed within a first sample chamber belonging to set 52 of the sample carrier, and a second measurand of the same sample is measured, by performing a second optical measurement upon (e.g., by acquiring microscopic images of) a portion of the sample that is disposed within a second sample chamber of set 52 of the sample carrier. For some applications, the first and second measurands are normalized with respect to each other, for example, using techniques as described in US 2019/0145963 to Zait, which is incorporated herein by reference.

Typically, in order to perform optical density measurements upon the sample, it is desirable to know the optical path length, the volume, and/or the thickness of the portion of the sample upon which the optical measurements were performed, as precisely as possible. Typically, an optical density measurement is performed on the second portion of the sample (which is typically placed into second set 54 of sample chambers in an undiluted form). For example, the concentration and/or density of a component may be measured by performing optical absorption, transmittance, fluorescence, and/or luminescence measurements upon the sample.

Referring again to FIG. 3B, for some applications, sample chambers belonging to set 54 (which is used for optical density measurements), define at least a first region 56 (which is typically deeper) and a second region 58 (which is typically shallower), the height of the sample chambers varying between the first and second regions in a predefined manner, e.g., as described in US 2019/0302099 to Pollak, which is incorporated herein by reference. The heights of first region 56 and second region 58 of the sample chamber are defined by a lower surface that is defined by the glass sheet and by an upper surface that is defined by the molded component. The upper surface at the second region is stepped with respect to the upper surface at the first region. The step between the upper surface at the first and second regions, provides a predefined height difference $\Delta h$ between the regions, such that even if the absolute height of the regions is not known to a sufficient degree of accuracy (for example, due to tolerances in the manufacturing process), the height difference $\Delta h$ is known to a sufficient degree of accuracy to determine a parameter of the sample, using the techniques described herein, and as described in US 2019/0302099 to Pollak, which is incorporated herein by reference. For some applications, the height of the sample chamber varies from the first region 56 to the second region 58, and the height then varies again from the second region to a third region 59, such that, along the sample chamber, first region 56 defines a maximum height region, second region 58 defines a medium height region, and third region 59 defines a minimum height region. For some applications, additional variations in height occur along the length of the sample chamber, and/or the height varies gradually along the length of the sample chamber.

As described hereinabove, while the sample is disposed in the sample carrier, optical measurements are performed upon the sample using one or more optical measurement devices 24. Typically, the sample is viewed by the optical measurement devices via the glass layer, glass being transparent at least to wavelengths that are typically used by the optical measurement device. Typically, the sample carrier is inserted into optical measurement unit 31, which houses the optical measurement device while the optical measurements are performed. Typically, the optical measurement unit houses the sample carrier such that the molded layer is disposed above the glass layer, and such that the optical measurement unit is disposed below the glass layer of the sample carrier and is able to perform optical measurements upon the sample via the glass layer. The sample carrier is formed by adhering the glass layer to the molded component. For example, the glass layer and the molded component may be bonded to each other during manufacture or assembly (e.g. using thermal bonding, solvent-assisted bonding, ultrasonic welding, laser welding, heat staking, adhesive, mechanical clamping and/or additional substrates). For some applications, the glass layer and the molded component are bonded to each other during manufacture or assembly using adhesive layer 46.

In accordance with some applications of the present invention, a portion of a blood sample that comprises a cell suspension is placed within a sample chamber that is a cavity 55 that includes a base surface 57 (shown in FIG. 3C). In accordance with respective applications, the cavity is a closed (i.e., covered) cavity, or is an open (i.e., uncovered) cavity. For example, as described hereinabove, the first portion of the blood sample is typically placed in first set 52 of the sample chambers. For some applications, the first portion of the blood sample is placed in first set 52 of the sample chambers, subsequent to the first portion of the blood sample having been diluted. Typically, the cells in the cell suspension are allowed to settle on the base surface of the sample chamber to form a monolayer of cells on the base surface of the sample chamber. As noted hereinabove, in the context of the present application, the term monolayer is used to mean a layer of cells that have settled, such as to be disposed within a single focus field of the microscope (referred to herein as "the monolayer focus field"). Within the monolayer there may be some overlap of cells, such that within certain areas there are two or more overlapping layers of cells. For example, red blood cells may overlap with each other within the monolayer, and/or platelets may overlap with, or be disposed above, red blood cells within the monolayer.

Subsequent to the cells having been left to settle on the base surface of the sample chamber (e.g. by having been left to settle for a predefined time interval), at least one microscopic image of at least a portion of the monolayer of cells is typically acquired. Typically, a plurality of images of the monolayer are acquired, each of the images corresponding to an imaging field that is located at a respective, different area within the imaging plane of the monolayer. Typically, an optimum depth level at which to focus the microscope in order to image the monolayer is determined, e.g., using techniques as described in U.S. Pat. No. 10,176,565 to Greenfield, which is incorporated herein by reference. For some applications, respective imaging fields have different optimum depth levels from each other. For some applications, platelets that have settled within the monolayer are identified within the at least one microscopic image of at least a portion of the monolayer of cells.

The inventors of the present application have noticed that it is often the case that, even after having been left to settle such as to form a monolayer using the techniques described herein, not all of the platelets within a blood sample settle within the monolayer, and some cells continue to be suspended within the cell solution. More specifically, the inventors have found that it is typically the case that, even after the sample has been left to settle for approximately two minutes, between 10 percent and 70 percent of the platelets within the sample do not settle within the monolayer focus field. Typically, if the monolayer is allowed to form over a longer time period, then more platelets settle within the monolayer focus field. However, the inventors have found that even if the monolayer is allowed to form over a relatively long time period (e.g., between 15 and 30 minutes), some platelets still remain suspended within the solution such that the platelets are not disposed within the monolayer focus field. Typically, the number of platelets that remain suspended within the solution (such that the platelets are not disposed within the monolayer focus field) is dependent on the time for which the monolayer is allowed to form, in addition to the height of the cavity in which the cell solution is placed.

Therefore, for some applications, in order to accurately estimate the number of platelets in the sample, platelets that are suspended within the cell solution are identified, in addition to identifying platelets within the monolayer focus field. Typically, such platelets are identified by focusing the microscope at additional depth levels to the depth level(s) to which the microscope is focused in order to image the monolayer of cells (referred to herein as "the monolayer depth level(s)"), and acquiring images at the additional depth levels. Typically, the platelets within the images that are acquired at the additional depth levels are identified and counted, and, based upon the count of platelets within those images, a total count of the platelets that are suspended within the cell solution is estimated.

As described hereinabove, typically, the platelets that are suspended within the cell solution are identified by acquiring microscopic images at additional depth levels. Typically, the height interval between successive additional depth levels at which the cell solution is imaged is dependent upon the depth of focus of the microscope optical system. For example, depending upon the depth of focus of the microscope optical system, the microscope may be focused at additional depth levels that are separated from each other by a given height difference (e.g., between 1 micron and 10 microns), over the height of the portion of the sample that is within the sample chamber. Typically, within the monolayer depth level(s), microscopic images of the sample chamber are acquired from a relatively large number of imaging fields, as described hereinabove. For example, microscopic images of tire monolayer may be acquired from between 100 and 500 imaging fields. Typically, between 5 and 100 (e.g., between 10 and 50) of these imaging fields are optimized for identifying platelets, by acquiring these images at an increased exposure time relative to other images. For some applications, for each of the additional depth levels, microscopic images are acquired from only a subset of the imaging fields, in order to reduce the amount of time that it takes to image the portion of the sample relative to if microscopic images are acquired from all of the imaging fields. For example, microscopic images from between 3 and 10 imaging fields may be acquired within each of the additional depth levels. For some applications, the ratio of (a) the number of imaging fields at which the monolayer is imaged and that are optimized for identifying platelets (e.g., by having an increased exposure time, as described above) to (b) the number of imaging fields at which each of the additional depth levels is imaged, is between 2:1 and 10:1. For some applications, the ratio is 1:1.

For some applications, the portion of the sample is imaged at the additional depth levels under brightfield imaging, e.g., as described hereinabove. Alternatively or additionally, the portion of the sample is imaged at the additional depth levels under fluorescent imaging, e.g., as described hereinabove. For some applications, the first portion of the sample is stained with one or more stains that cause platelets within the sample to be visible under bright field imaging conditions and/or under fluorescent imaging conditions, e.g., as described hereinabove. For example, the first portion of the sample may be stained with methylene blue and/or Romanowsky stains. For some applications, images having imaging parameters that are not necessarily optimized for platelet detection are acquired at the additional depth levels, for example, in order to detect other entities, which may otherwise be confused with platelets.

Figure 4B:
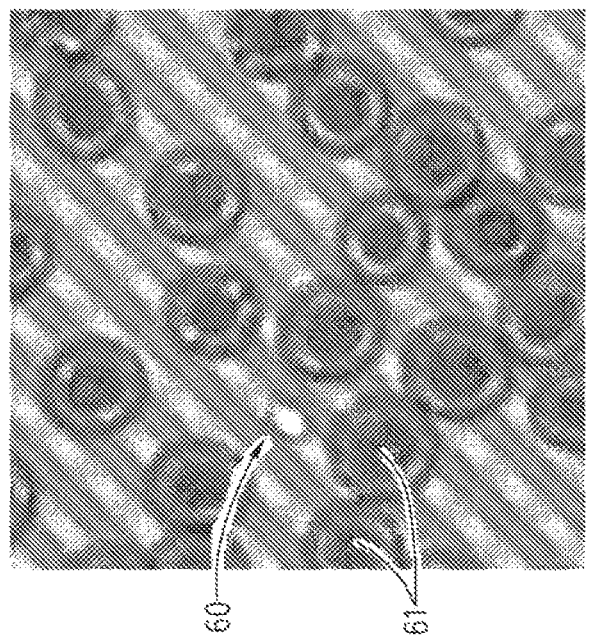
FIGS. 4A and 4B are microscope images acquired from a monolayer depth level under brightfield imaging using respective imaging parameters, in accordance with some applications of the present invention.
Figure 4A:
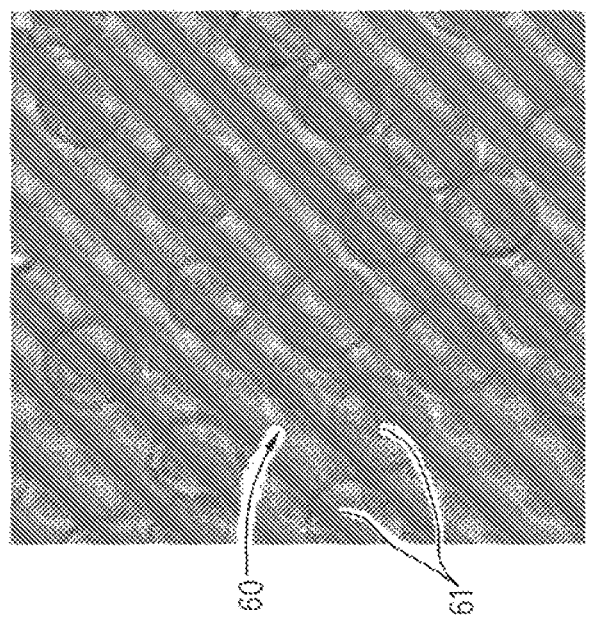
Figure 5:
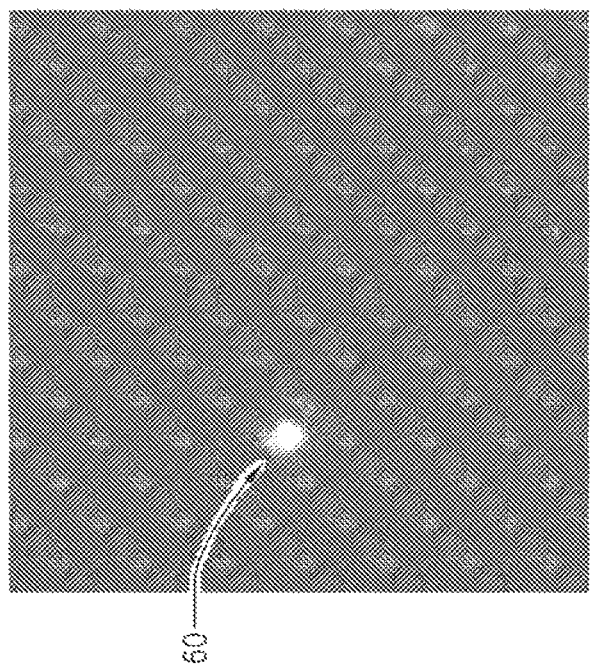
FIG. 5 is a fluoroscopic microscope image acquired from the monolayer depth level, in accordance with some applications of the present invention.

Reference is now made to FIGS. 4A and 4B, which are microscope images acquired from the monolayer depth level under brightfield imaging using respective imaging parameters, in accordance with some applications of the present invention. As may be observed, a platelet 60 is identifiable within the images, and the platelet is surrounded by erythrocytes 61. The erythrocytes are in focus, since the images were acquired at the monolayer depth level, within which the erythrocytes are settled. Reference is also made to FIG. 5, which is a fluoroscopic microscope image acquired from the monolayer depth level, in accordance with some applications of the present invention. Again, a platelet 60 is identifiable within the images, and the platelet is surrounded by erythrocytes, which are faintly visible.

Figure 6B:
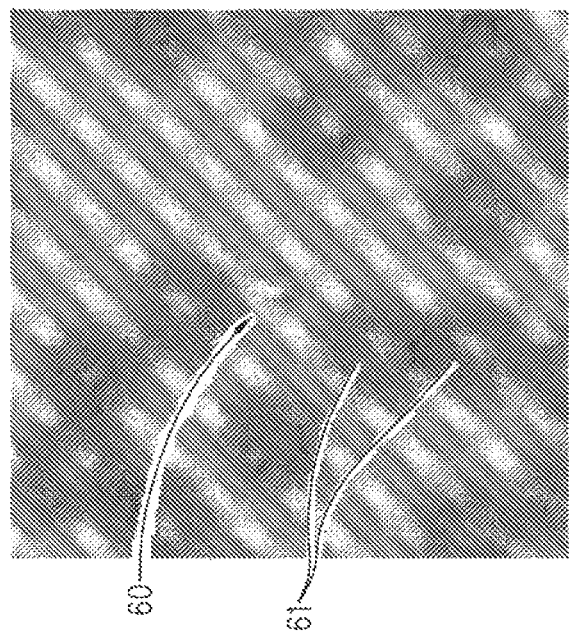
FIGS. 6A and 6B are microscope images acquired from an additional depth level (i.e., not the monolayer depth level) under bright field imaging, using respective imaging parameters, in accordance with some applications of the present invention.
Figure 6A:
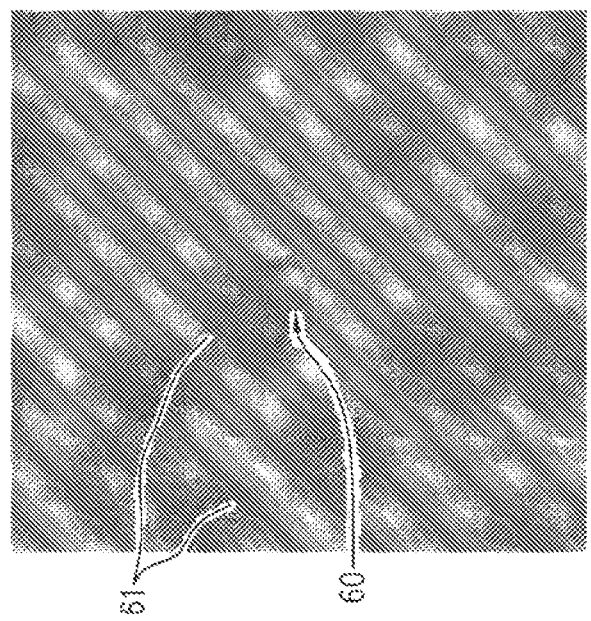
Figure 7:
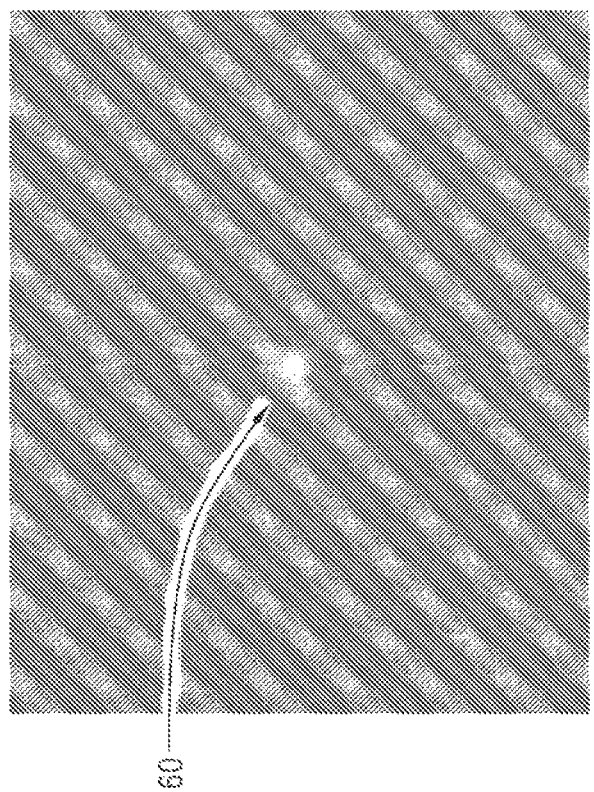
FIG. 7 is a fluoroscopic microscope image acquired from the additional depth level, in accordance with some applications of the present invention.

Reference is additionally made to FIGS. 6A and 6B, which are microscope images acquired from an additional depth level (i.e., not the monolayer depth level) under brightfield imaging, using respective imaging parameters, in accordance with some applications of the present invention. As may be observed a platelet 60 is identifiable within the images, and erythrocytes are visible in the background. The erythrocytes are out of focus since the images were not acquired at the monolayer depth level within which the erythrocytes have settled. Reference is also made to FIG. 7, which is a fluoroscopic microscope image acquired from the additional depth level in accordance with some applications of the present invention. Again, a platelet 60 is identifiable within the images.

Typically, platelets that have not settled within the monolayer are identified within the images that are acquired at the additional depth levels. (It is noted the identified platelets may include platelets that are out of focus within the additional depth levels.) Further typically, based upon the platelets that are identified within the images that are acquired at the additional depth levels, a count of the platelets that have not settled within the monolayer is estimated. For some applications, in order to perform the above-described estimate, the computer processor is configured to avoid duplicate counts of platelets within images that are acquired at adjacent depth levels, by identifying platelets within images that are acquired at adjacent depth levels that are disposed at similar locations to each other within the imaging plane and determining whether the platelets as identified at each of the depth levels are likely to correspond to a single (i.e., the same) platelet. For some applications, in determining whether the platelets as identified at each of the adjacent depth levels are likely to correspond to a single (i.e., the same) platelet, the computer processor accounts for lateral movement of the platelets between the images acquired at each of the adjacent depth levels. For some applications, in order to perform the above-described estimate, the computer processor is configured to account for interference with the visibility of platelets by white blood cells that are disposed within the monolayer and/or that are suspended within the cell solution. For example, within fluorescent images that am acquired at the additional depth levels, white blood cells that fluoresce within the monolayer are typically visible and interfere with the visibility of platelets that are disposed above the white blood cells. Therefore, platelets that are disposed above white blood cells within the monolayer may be excluded from the platelet count. Since platelets within the volumes above white blood cells am excluded from the count, the number of platelets within these volumes may be estimated. Alternatively or additionally, in order to perform the above-described estimate, the computer processor is configured to account for interference with the visibility of platelets by red blood cells that are disposed within the monolayer, and that may interfere with the identification of platelets within bright field images.

For some applications, counts of platelets within the monolayer depth level and/or within the additional depth levels are normalized, and/or other statistical analysis techniques are applied to one or both of these counts. For example, the count of the platelets within a given imaging field may be normalized with respect to the red blood cell count within that field, the time dynamics of the settling of the platelets may be incorporated into the estimate of platelets that are not settled within the monolayer, and/or outliers may be removed from the estimates. For some applications, additional imaging fields are imaged, if there is a low platelet count, if there are outlier fields (e.g., with very high or very low platelet counts), and/or if imaging fields that are imaged at the additional depth levels are rejected due to errors.

For some applications, a count of the platelets that have settled within the monolayer is compared to a count of the platelets that have not settled within the monolayer. Typically, an output is generated in response to the comparison. For some applications, a clinical condition is derived and outputted to a user, based upon tire comparison of the count of the platelets that have settled within the monolayer and the count of the platelets that have not settled within the monolayer. For example, the extent of platelet activation within the sample may be derived, at least partially based upon the comparison. Alternatively or additionally, a clinical condition may be derived based upon the size, shape, settling time, and/or settling dynamics of the platelets. For some such applications, the settling dynamics of the platelets are determined by imaging the same imaging field a plurality of times, with a lime interval between each of the image acquisitions, and/or by determining until what height within the sample chamber platelets are present at a given time.

For some applications, the computer processor generates an output indicating that the sample should be prepared in a different way to how it was prepared (e.g., by modifying the diluent within which the sample is diluted, by adding a platelet activation agent, and/or by adding a coagulation agent), based upon the comparison.

For some applications, based upon the comparison between the count of the platelets that have settled within the monolayer and the count of the platelets that have not settled within the monolayer, the portion of the blood sample is invalidated from being used for performing at least some measurements upon the sample. For example, if the ratio of unsettled platelets to settled platelets is greater than a First given threshold, and/or lower than a second given threshold, then this might be interpreted as being indicative of a problem with the sample and/or the preparation thereof.

For some applications, a parameter of the sample (such as platelet volume, mean platelet volume, and/or median platelet volume) is determined based upon a measurement that is performed upon the first portion of the sample. For some applications, the measurement is calibrated, based upon the comparison between properties of the platelets that have settled within the monolayer and properties of the platelets that have not settled within the monolayer.

Figure 8:
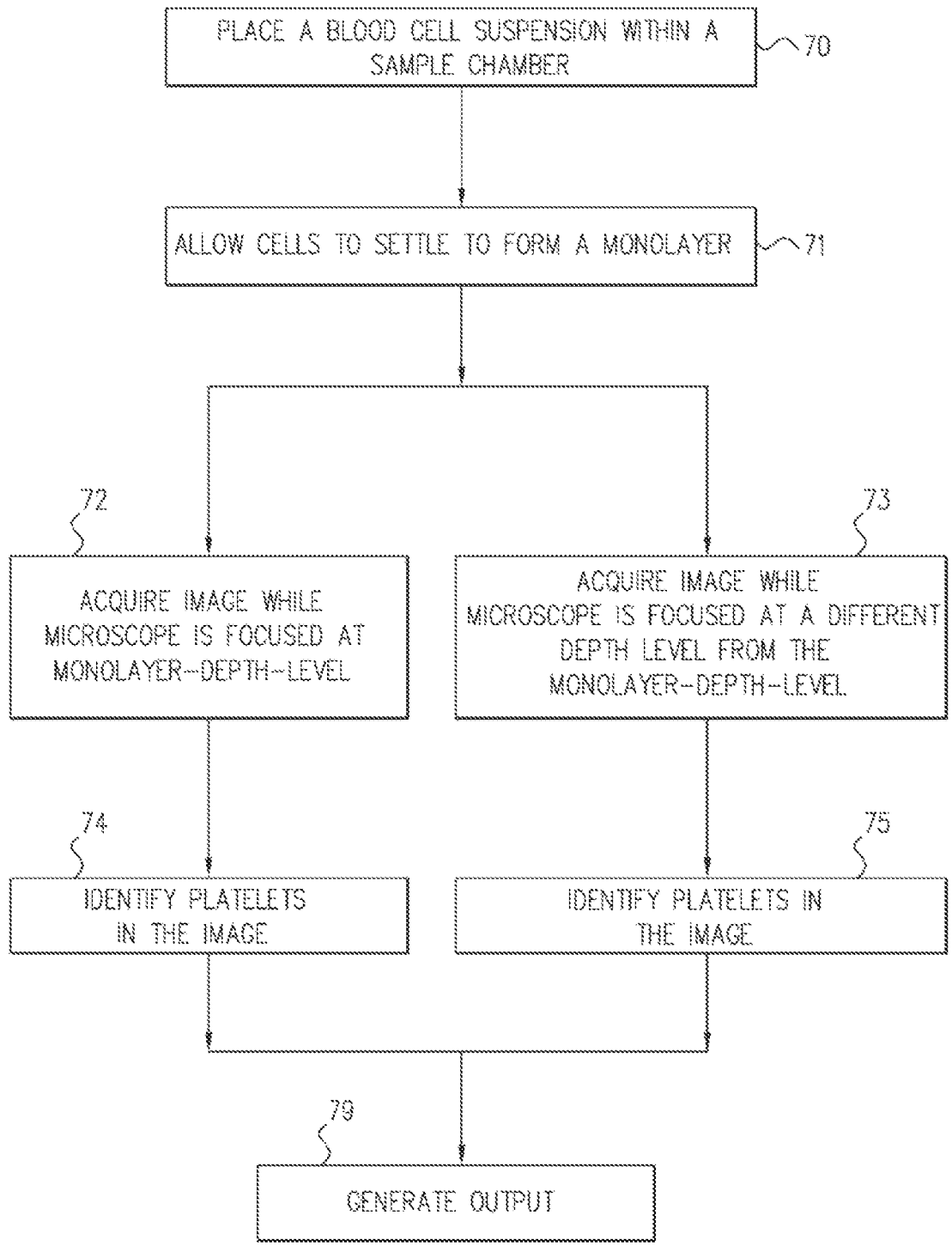
FIG. 8 is a flowchart showing steps of a method that is performed, in accordance with some applications of the present invention.
Figure 9:
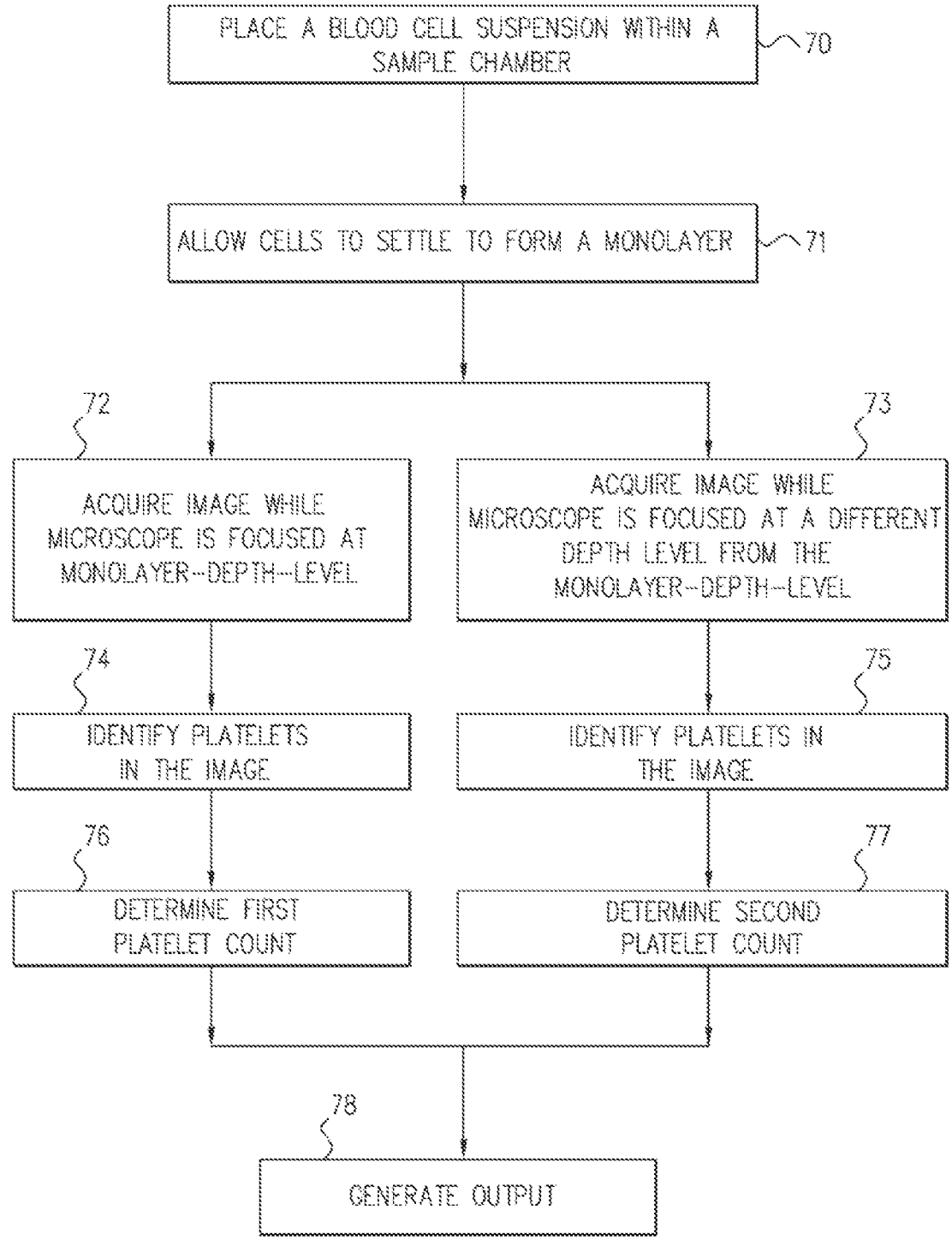
FIG. 9 is a flowchart showing steps of an additional method that is performed, in accordance with some applications of the present invention.

Reference is now made to FIG. 8 and FIG. 9, which are flowcharts showing step of methods that are performed with respect to platelets within a blood sample, in accordance with some applications of the present invention. For some applications, a cell suspension is placed within a sample chamber (step 70) and allowed to settle to form a monolayer (step 71). Subsequently, at least one image is acquired while the microscope is focused at the monolayer-depth-level (step 72), and platelets that have settled within the monolayer are identified in the image (step 74). Additionally, at least one microscopic image of the sample is acquired, while the microscope is focused at a different depth level from the monolayer-depth-level (step 73), and platelets that have not settled within the monolayer are identified within the at least one microscopic image at the different depth level from the monolayer-depth-level (step 75). An output at least partially based upon the platelets identified as having settled within the monolayer and the platelets identified as not having settled within the monolayer, is generated (step 79), as shown. For some applications, as shown in FIG. 9, following identifying the platelets in the images (steps 74 and 75), a first platelet count of platelets that have settled within the monolayer is determined (step 76), and a second count of platelets that have not settled within the monolayer is determined (step 77). An output is then generated (step 78) based upon the first and second platelet counts. For example, an output may be generated based on a comparison between the first and second platelet counts, in accordance with the methods described hereinabove.

In general, it is noted that although some applications of the present invention have been described with respect to platelets within a blood sample, the scope of the present invention includes applying the apparatus and methods described herein to a variety of entities within a variety of samples, mutatis mutandis. For example, the apparatus and methods that are described with reference to identifying platelets that have not settled within a monolayer may be performed with respect to other entities within a blood sample, mutatis mutandis. Such entities may include white blood cells, anomalous white blood cells, circulating tumor cells, red blood cells, reticulocytes, Howell-Jolly bodies, foreign bodies (such as bacteria, fungi, yeast or parasites), entities that are added to a diluent (such as beads), etc.

Figure 10:
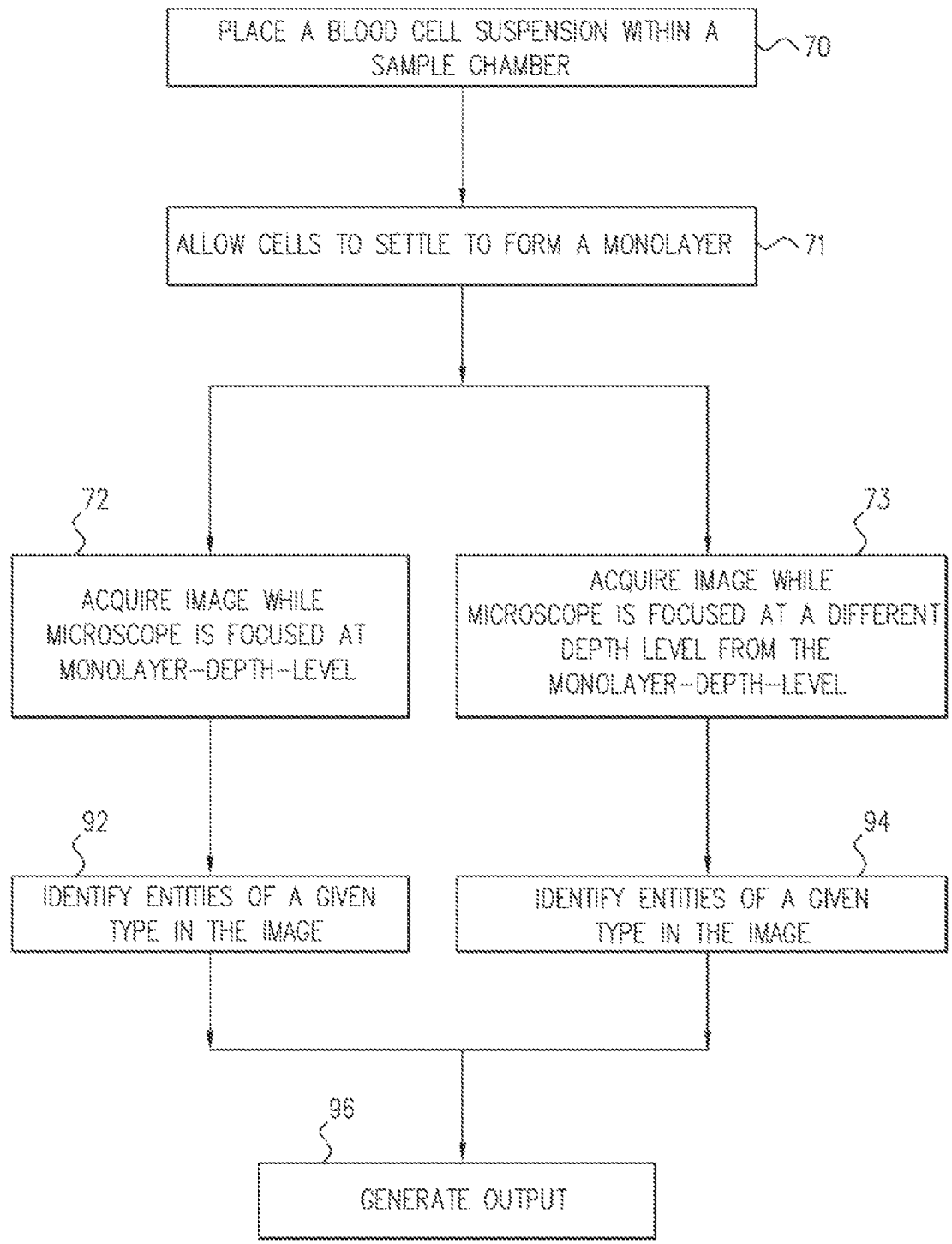
FIG. 10 is a flowchart showing steps of a further method that is performed, in accordance with some applications of the present invention.

Reference is now made to FIG. 10, which is a flowchart showing steps of a method that is performed with respect entities within a blood sample, in accordance with some applications of the present invention. As described hereinabove with reference to FIGS. 8 and FIG. 9, a cell suspension is placed within a sample chamber (step 70) and allowed to settle to form a monolayer (step 71). Subsequently, at least one image is acquired while the microscope is focused at the monolayer-depth-level (step 72), and entities of a given type are identified in the image (step 92). Additionally, at least one microscopic image of the sample is acquired, while the microscope is focused at a different depth level front the monolayer-depth-level (step 73), and entities of the given type that have not settled within the monolayer are identified within the at least one microscopic image at the different depth level from the monolayer-depth-level (step 94). An output at least partially based upon the entities of the given type identified as having settled within the monolayer and the entities of the given type identified as not having settled within the monolayer, is generated, as shown (step 96).

For some applications, the apparatus and methods described herein are applied to a biological sample, such as, blood, saliva, semen, sweat, sputum, vaginal fluid, stool, breast milk, bronchoalveolar lavage, gastric lavage, tears and/or nasal discharge, mutatis mutandis. The biological sample may be from any living creature, and is typically from warm blooded animals. For some applications, the biological sample is a sample from a mammal, e.g., from a human body. For some applications, the sample is taken from any domestic animal, zoo animals and farm animals, including but not limited to dogs, cats, horses, cows and sheep. Alternatively or additionally, the biological sample is taken from animals that act as disease vectors including deer or rats.

For some applications, the apparatus and methods described herein are applied to a non bodily sample. For some applications, the sample is an environmental sample, such as, a water (e.g. groundwater) sample, surface swab, soil sample, air sample, or any combination thereof, mutatis mutandis. In some embodiments, the sample is a food sample, such as, a meat sample, dairy sample, water sample, wash-liquid sample, beverage sample, and/or any combination thereof.

For some applications, the sample as described herein is a sample that includes blood or components thereof (e.g., a diluted or non-diluted whole blood sample, a sample including predominantly red blood cells, or a diluted sample including predominantly red blood cells), and parameters are determined relating to components in the blood such as platelets, white blood cells, anomalous white blood cells, circulating tumor cells, red blood cells, reticulocytes, Howell-Jolly bodies, etc.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer loadable medium is a non-transitory computer-usable or computer readable medium.

Examples of a computer-readable medium include a semiconductor or solid state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor (e.g., computer processor 28) coupled directly or indirectly to memory elements (e.g., memory 30) through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the flowchart blocks and algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described heroin, computer processor 28 typically acts as a special purpose sample-analysis computer processor. Typically, the operations described herein that are performed by computer processor 28 transform the physical state of memory 30, which is a real physical article, to have a different magnetic polarity, electrical charge, or the like depending on the technology of die memory that is used.

The apparatus and methods described herein may be used in conjunction with apparatus and methods described in any one of the following patents or patent applications, all of which are incorporated herein by reference:

U.S. Pat. No. 9,522,396 to Bachelet;
U.S. Pat. No. 10,176,565 to Greenfield;
U.S. Pat. No. 10,640,807 to Pollak;
U.S. Pat. No. 9,329,129 to Pollak;
U.S. Pat. No. 10,093,957 to Pollak;
U.S. Pat. No. 10,831,013 to Yorav Raphael;
U.S. Pat. No. 10,843,190 to Bachelet;
U.S. Pat. No. 10,482,595 to Yorav Raphael;
U.S. Pat. No. 10,488,644 to Eshel;
WO 17/168411 to Eshel;
US 2019/0302099 to Pollak;
US 2019/0145963 to Zait; and
WO 19/097387 to Yorav-Raphael.

It will be appreciated by persons skilled in the art that the present invention is not limited to what has been particularly shown and described hereinabove. Rather, the scope of the present invention includes both combinations and subcombinations of the various features described hereinabove, as well as variations and modification thereof that are not in the prior art, which would occur to persons skilled in the art upon reading the foregoing description.

The invention claimed is:

1. A method comprising:
 placing at least a portion of a blood sample that is a cell suspension within a sample chamber that is a cavity that includes a base surface;
 allowing the cells in the cell suspension to settle on the base surface of the sample chamber to form a monolayer of cells on the base surface of the sample chamber;
 acquiring at least one first microscopic image of at least a portion of the monolayer of cells, using a microscope while the microscope is focused at a monolayer-depth-level, at which the monolayer is within focus of the microscope;
identifying platelets that have settled within the monolayer, within the at least one microscopic image;
based upon the platelets that are identified within the at least one microscopic image, determining a first platelet count of platelets that have settled within the monolayer;
acquiring at least one additional microscopic image of the portion of the sample using the microscope, while the microscope is focused at a different depth level from the monolayer-depth-level;
identifying platelets that have not settled within the monolayer, within the at least one additional microscopic image;
based upon the platelets that are identified within the at least one additional microscopic image, determining a second platelet count of platelets that have not settled within the monolayer; and
generating an output based upon the first and second platelet counts.

2. The method according to claim 1, further comprising deriving an error with the blood sample at least partially based upon comparing the first and second platelet counts to each other, wherein generating the output comprises generating an indication of the error.

3. The method according to claim 1, further comprising deriving an error with preparation of the blood sample at least partially based upon comparing the first and second platelet counts to each other, wherein generating the output comprises generating an indication of the error.

4. The method according to claim 1, further comprising deriving a clinical condition of the subject at least partially based upon comparing the first and second platelet counts to each other, wherein generating the output comprises generating an indication of the clinical condition.

5. The method according to claim 1, further comprising deriving a measure of platelet activation at least partially based upon comparing the first and second platelet counts to each other, wherein generating the output comprises generating an indication of the platelet activation.

6. The method according to claim 1, wherein identifying platelets that have not settled within the monolayer within the at least one additional microscopic image comprises accounting for interference with visibility of platelets by white blood cells that are disposed within the monolayer.

7. The method according to claim 1, wherein identifying platelets that have not settled within the monolayer within the at least one additional microscopic image comprises accounting for interference with visibility of platelets by red blood cells that are disposed within the monolayer.

8. The method according to claim 1, wherein:
acquiring the at least one first microscopic image of the portion of the monolayer of cells comprises acquiring a first number of images of the monolayer at respective imaging fields while the microscope is focused at one or more monolayer-depth-levels, at which the monolayer is within focus of the microscope;
acquiring the at least one additional microscopic image of the portion of the sample comprises acquiring a second number of images at respective imaging fields, while the microscope is focused at the different depth level from the monolayer-depth-level; and
a ratio between the first number and the second number is greater than 2:1.

9. The method according to claim 1, wherein:
acquiring the at least one additional microscopic image of the portion of the sample comprises acquiring a plurality of additional microscopic images, while the microscope is focused at respective different depth levels from the monolayer-depth-level; and
identifying platelets that have not settled within the monolayer within the at least one additional microscopic image comprises avoiding duplicate counts of platelets within images that are acquired at adjacent depth levels.

10. The method according to claim 9, wherein avoiding duplicate counts of platelets within images that are acquired at adjacent depth levels comprises accounting for lateral movement of platelets between acquisitions of the images that are acquired at adjacent depth levels.

11. A method comprising:
placing at least a portion of a blood sample that is a cell suspension within a sample chamber that is a cavity that includes a base surface;
allowing the cells in the cell suspension to settle on the base surface of the sample chamber to form a monolayer of cells on the base surface of the carrier;
acquiring at least one microscopic image of at least a portion of the monolayer of cells, using a microscope while the microscope is focused at a monolayer-depth-level, at which the monolayer is within focus of the microscope;
identifying platelets that have settled within the monolayer, within the at least one microscopic image;
acquiring at least one additional microscopic image of the portion of the sample using the microscope, while the microscope is focused at a different depth level from the monolayer-depth-level;
identifying platelets that have not settled within the monolayer, within the at least one additional microscopic image; and
generating an output at least partially based upon the platelets identified as having settled within the monolayer and the platelets identified as not having settled within the monolayer.

12. The method according to claim 11, further comprising estimating a platelet count for the blood sample based upon the platelets identified as having settled within the monolayer and the platelets identified as not having settled within the monolayer, wherein generating the output comprises generating an indication of the platelet count.

13. The method according to claim 11, further comprising deriving a platelet-settling characteristic of the sample based upon the platelets identified as having settled within the monolayer and the platelets identified as not having settled within the monolayer, wherein generating the output comprises generating an indication of the platelet-settling characteristic.

14. The method according to claim 11, further comprising deriving a characteristic of platelets within the sample based upon a combination of the platelets identified as having settled within the monolayer and the platelets identified as not having settled within the monolayer, wherein generating the output comprises generating an indication of the derived characteristic.

15. Apparatus comprising:
a sample chamber that is a cavity that includes a base surface and that is configured to receive at least a portion of a blood sample that is a cell suspension and to allow the cells in the cell suspension to settle on the base surface of the sample chamber to form a monolayer of cells on the base surface of the sample chamber;
a microscope configured to acquire:
  at least one first microscopic image of at least a portion of the monolayer of cells, while the microscope is focused at a monolayer-depth-level, at which the monolayer is within focus of the microscope, and
  at least one additional microscopic image of the portion of the sample, while the microscope is focused at a different depth level from the monolayer-depth-level; and
a computer processor configured to:
  identify platelets that have settled within the monolayer, within the at least one first microscopic image,
  identify platelets that have not settled within the monolayer, within the at least one additional microscopic image, and
  generate an output at least partially based upon the platelets identified as having settled within the monolayer and the platelets identified as not having settled within the monolayer.

* * * * *